(12) United States Patent
Dimmick

(10) Patent No.: US 12,112,316 B2
(45) Date of Patent: *Oct. 8, 2024

(54) TOKENIZATION REQUEST VIA ACCESS DEVICE

(71) Applicant: Visa International Service Association, San Francisco, CA (US)

(72) Inventor: James Dimmick, Belmont, CA (US)

(73) Assignee: Visa International Service Association, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/178,020

(22) Filed: Mar. 3, 2023

(65) Prior Publication Data

US 2023/0206221 A1 Jun. 29, 2023

Related U.S. Application Data

(63) Continuation of application No. 14/952,444, filed on Nov. 25, 2015, now Pat. No. 11,620,643.

(60) Provisional application No. 62/084,738, filed on Nov. 26, 2014.

(51) Int. Cl.
  *G06Q 20/36* (2012.01)
  *G06Q 20/38* (2012.01)
  *G06Q 20/42* (2012.01)

(52) U.S. Cl.
  CPC ......... *G06Q 20/3674* (2013.01); *G06Q 20/36* (2013.01); *G06Q 20/385* (2013.01); *G06Q 20/425* (2013.01)

(58) Field of Classification Search
  CPC ................................. G06Q 20/3674
  See application file for complete search history.

(56) References Cited

U.S. PATENT DOCUMENTS

| | | |
|---|---|---|
| 5,613,012 A | 3/1997 | Hoffman et al. |
| 5,781,438 A | 7/1998 | Lee et al. |
| 5,883,810 A | 3/1999 | Franklin et al. |
| 5,953,710 A | 9/1999 | Fleming |
| 5,956,699 A | 9/1999 | Wong et al. |
| 6,000,832 A | 12/1999 | Franklin et al. |
| 6,014,635 A | 1/2000 | Harris et al. |
| 6,044,360 A | 3/2000 | Picciallo |
| 6,163,771 A | 12/2000 | Walker et al. |
| 6,227,447 B1 | 5/2001 | Campisano |

(Continued)

FOREIGN PATENT DOCUMENTS

| CN | 101266670 A | 9/2008 |
|---|---|---|
| CN | 102844776 A | 12/2012 |

(Continued)

OTHER PUBLICATIONS

Application No. CN202110863976.1, Office Action, Mailed On May 20, 2023, 20 pages.

(Continued)

*Primary Examiner* — John W Hayes
*Assistant Examiner* — Zehra Raza
(74) *Attorney, Agent, or Firm* — Kilpatrick Townsend & Stockton LLP

(57) ABSTRACT

Embodiments of the invention are directed to a method for submitting a tokenization request via an access device. Embodiments allow tokens to be retrieved for complex mobile devices as well as basic card-type devices. Token requests can be formatted as authorization request messages and transmitted along authorization communication channels.

20 Claims, 11 Drawing Sheets

(56) References Cited

U.S. PATENT DOCUMENTS

| | | |
|---|---|---|
| 6,236,981 B1 | 5/2001 | Hill |
| 6,267,292 B1 | 7/2001 | Walker et al. |
| 6,327,578 B1 | 12/2001 | Linehan |
| 6,341,724 B2 | 1/2002 | Campisano |
| 6,385,596 B1 | 5/2002 | Wiser et al. |
| 6,422,462 B1 | 7/2002 | Cohen |
| 6,425,523 B1 | 7/2002 | Shem-Ur et al. |
| 6,592,044 B1 | 7/2003 | Wong et al. |
| 6,636,833 B1 | 10/2003 | Flitcroft et al. |
| 6,748,367 B1 | 6/2004 | Lee |
| 6,805,287 B2 | 10/2004 | Bishop et al. |
| 6,879,965 B2 | 4/2005 | Fung et al. |
| 6,891,953 B1 | 5/2005 | DeMello et al. |
| 6,901,387 B2 | 5/2005 | Wells et al. |
| 6,931,382 B2 | 8/2005 | Laage et al. |
| 6,938,019 B1 | 8/2005 | Uzo |
| 6,941,285 B2 | 9/2005 | Sarcanin |
| 6,980,670 B1 | 12/2005 | Hoffman et al. |
| 6,990,470 B2 | 1/2006 | Hogan et al. |
| 6,991,157 B2 | 1/2006 | Bishop et al. |
| 7,051,929 B2 | 5/2006 | Li |
| 7,069,249 B2 | 6/2006 | Stolfo et al. |
| 7,103,576 B2 | 9/2006 | Mann, III et al. |
| 7,113,930 B2 | 9/2006 | Eccles et al. |
| 7,136,835 B1 | 11/2006 | Flitcroft et al. |
| 7,177,835 B1 | 2/2007 | Walker et al. |
| 7,177,848 B2 | 2/2007 | Hogan et al. |
| 7,194,437 B1 | 3/2007 | Britto et al. |
| 7,209,561 B1 | 4/2007 | Shankar et al. |
| 7,264,154 B2 | 9/2007 | Harris |
| 7,287,692 B1 | 10/2007 | Patel et al. |
| 7,292,999 B2 | 11/2007 | Hobson et al. |
| 7,350,230 B2 | 3/2008 | Forrest |
| 7,353,382 B2 | 4/2008 | Labrou et al. |
| 7,379,919 B2 | 5/2008 | Hogan et al. |
| RE40,444 E | 7/2008 | Linehan |
| 7,415,443 B2 | 8/2008 | Hobson et al. |
| 7,444,676 B1 | 10/2008 | Asghari-Kamrani et al. |
| 7,469,151 B2 | 12/2008 | Khan et al. |
| 7,548,889 B2 | 6/2009 | Bhambri et al. |
| 7,567,934 B2 | 7/2009 | Flitcroft et al. |
| 7,567,936 B1 | 7/2009 | Peckover et al. |
| 7,571,139 B1 | 8/2009 | Giordano et al. |
| 7,571,142 B1 | 8/2009 | Flitcroft et al. |
| 7,580,898 B2 | 8/2009 | Brown et al. |
| 7,584,153 B2 | 9/2009 | Brown et al. |
| 7,593,896 B1 | 9/2009 | Flitcroft et al. |
| 7,606,560 B2 | 10/2009 | Labrou et al. |
| 7,627,531 B2 | 12/2009 | Breck et al. |
| 7,627,895 B2 | 12/2009 | Gifford et al. |
| 7,650,314 B1 | 1/2010 | Saunders |
| 7,685,037 B2 | 3/2010 | Reiners et al. |
| 7,702,578 B2 | 4/2010 | Fung et al. |
| 7,707,120 B2 | 4/2010 | Dominguez et al. |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II et al. |
| 7,784,685 B1 | 8/2010 | Hopkins, III |
| 7,793,851 B2 | 9/2010 | Mullen |
| 7,801,826 B2 | 9/2010 | Labrou et al. |
| 7,805,376 B2 | 9/2010 | Smith |
| 7,805,378 B2 | 9/2010 | Berardi et al. |
| 7,818,264 B2 | 10/2010 | Hammad |
| 7,828,220 B2 | 11/2010 | Mullen |
| 7,835,960 B2 | 11/2010 | Breck et al. |
| 7,841,523 B2 | 11/2010 | Oder, II et al. |
| 7,841,539 B2 | 11/2010 | Hewton |
| 7,844,550 B2 | 11/2010 | Walker et al. |
| 7,848,980 B2 | 12/2010 | Carlson |
| 7,849,020 B2 | 12/2010 | Johnson |
| 7,853,529 B1 | 12/2010 | Walker et al. |
| 7,853,995 B2 | 12/2010 | Chow et al. |
| 7,865,414 B2 | 1/2011 | Fung et al. |
| 7,873,579 B2 | 1/2011 | Hobson et al. |
| 7,873,580 B2 | 1/2011 | Hobson et al. |
| 7,890,393 B2 | 2/2011 | Talbert et al. |
| 7,891,563 B2 | 2/2011 | Oder, II et al. |
| 7,896,238 B2 | 3/2011 | Fein et al. |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein et al. |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders et al. |
| 8,046,256 B2 | 10/2011 | Chien et al. |
| 8,060,448 B2 | 11/2011 | Jones |
| 8,060,449 B1 | 11/2011 | Zhu |
| 8,074,877 B2 | 12/2011 | Mullen et al. |
| 8,074,879 B2 | 12/2011 | Harris |
| 8,082,210 B2 | 12/2011 | Hansen et al. |
| 8,095,113 B2 | 1/2012 | Kean et al. |
| 8,104,679 B2 | 1/2012 | Brown |
| RE43,157 E | 2/2012 | Bishop et al. |
| 8,109,436 B1 | 2/2012 | Hopkins, III |
| 8,121,942 B2 | 2/2012 | Carlson et al. |
| 8,121,956 B2 | 2/2012 | Carlson et al. |
| 8,126,449 B2 | 2/2012 | Beenau et al. |
| 8,171,525 B1 | 5/2012 | Pelly et al. |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza et al. |
| 8,219,489 B2 | 7/2012 | Patterson |
| 8,224,702 B2 | 7/2012 | Mengerink et al. |
| 8,225,385 B2 | 7/2012 | Chow et al. |
| 8,229,852 B2 | 7/2012 | Carlson |
| 8,265,993 B2 | 9/2012 | Chien et al. |
| 8,280,777 B2 | 10/2012 | Mengerink et al. |
| 8,281,991 B2 | 10/2012 | Wentker et al. |
| 8,328,095 B2 | 12/2012 | Oder, II et al. |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders et al. |
| 8,401,539 B2 | 3/2013 | Beenau et al. |
| 8,401,898 B2 | 3/2013 | Chien et al. |
| 8,402,555 B2 | 3/2013 | Grecia |
| 8,403,211 B2 | 3/2013 | Brooks et al. |
| 8,412,623 B2 | 4/2013 | Moon et al. |
| 8,412,837 B1 | 4/2013 | Emigh et al. |
| 8,417,642 B2 | 4/2013 | Oren |
| 8,423,453 B1 | 4/2013 | Elliott |
| 8,433,116 B2 | 4/2013 | Butler et al. |
| 8,447,699 B2 | 5/2013 | Batada et al. |
| 8,453,223 B2 | 5/2013 | Svigals et al. |
| 8,453,925 B2 | 6/2013 | Fisher et al. |
| 8,458,487 B1 | 6/2013 | Palgon et al. |
| 8,484,134 B2 | 7/2013 | Hobson et al. |
| 8,485,437 B2 | 7/2013 | Mullen et al. |
| 8,494,959 B2 | 7/2013 | Hathaway et al. |
| 8,498,908 B2 | 7/2013 | Mengerink et al. |
| 8,504,475 B2 | 8/2013 | Brand et al. |
| 8,504,478 B2 | 8/2013 | Saunders et al. |
| 8,510,816 B2 | 8/2013 | Quach et al. |
| 8,533,860 B1 | 9/2013 | Grecia |
| 8,538,845 B2 | 9/2013 | Liberty |
| 8,555,079 B2 | 10/2013 | Shablygin et al. |
| 8,566,168 B1 | 10/2013 | Bierbaum et al. |
| 8,567,670 B2 | 10/2013 | Stanfield et al. |
| 8,571,939 B2 | 10/2013 | Lindsey et al. |
| 8,577,336 B2 | 11/2013 | Mechaley, Jr. |
| 8,577,803 B2 | 11/2013 | Chatterjee et al. |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | McGuire et al. |
| 8,589,237 B2 | 11/2013 | Fisher |
| 8,589,271 B2 | 11/2013 | Evans |
| 8,589,291 B2 | 11/2013 | Carlson et al. |

(56) References Cited

U.S. PATENT DOCUMENTS

| | | |
|---|---|---|
| 8,595,098 B2 | 11/2013 | Starai et al. |
| 8,595,812 B2 | 11/2013 | Bomar et al. |
| 8,595,850 B2 | 11/2013 | Spies et al. |
| 8,606,638 B2 | 12/2013 | Dragt |
| 8,606,700 B2 | 12/2013 | Carlson et al. |
| 8,606,720 B1 | 12/2013 | Baker et al. |
| 8,615,468 B2 | 12/2013 | Varadarajan |
| 8,620,754 B2 | 12/2013 | Fisher |
| 8,635,157 B2 | 1/2014 | Smith et al. |
| 8,646,059 B1 | 2/2014 | von Behren et al. |
| 8,651,374 B2 | 2/2014 | Brabson et al. |
| 8,656,180 B2 | 2/2014 | Shablygin et al. |
| 8,751,391 B2 | 6/2014 | Freund |
| 8,762,263 B2 | 6/2014 | Gauthier et al. |
| 8,763,142 B2 | 6/2014 | McGuire et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 8,935,777 B2 | 1/2015 | DeSoto et al. |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 2001/0029485 A1 | 10/2001 | Brody et al. |
| 2001/0034720 A1 | 10/2001 | Armes |
| 2001/0054003 A1 | 12/2001 | Chien et al. |
| 2002/0007320 A1 | 1/2002 | Hogan et al. |
| 2002/0016749 A1 | 2/2002 | Borecki et al. |
| 2002/0029193 A1 | 3/2002 | Ranjan et al. |
| 2002/0035548 A1 | 3/2002 | Hogan et al. |
| 2002/0073045 A1 | 6/2002 | Rubin et al. |
| 2002/0116341 A1 | 8/2002 | Hogan et al. |
| 2002/0133467 A1 | 9/2002 | Hobson et al. |
| 2002/0147913 A1 | 10/2002 | Lun Yip |
| 2003/0028481 A1 | 2/2003 | Flitcroft et al. |
| 2003/0130955 A1 | 7/2003 | Hawthorne |
| 2003/0191709 A1 | 10/2003 | Elston et al. |
| 2003/0191945 A1 | 10/2003 | Keech |
| 2004/0010462 A1 | 1/2004 | Moon et al. |
| 2004/0050928 A1 | 3/2004 | Bishop et al. |
| 2004/0059682 A1 | 3/2004 | Hasumi et al. |
| 2004/0093281 A1 | 5/2004 | Silverstein et al. |
| 2004/0139008 A1 | 7/2004 | Mascavage, III |
| 2004/0143532 A1 | 7/2004 | Lee |
| 2004/0158532 A1 | 8/2004 | Breck et al. |
| 2004/0210449 A1 | 10/2004 | Breck et al. |
| 2004/0210498 A1 | 10/2004 | Freund |
| 2004/0232225 A1 | 11/2004 | Bishop et al. |
| 2004/0260646 A1 | 12/2004 | Berardi et al. |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer et al. |
| 2005/0269402 A1 | 12/2005 | Spitzer et al. |
| 2006/0235795 A1 | 10/2006 | Johnson et al. |
| 2006/0237528 A1 | 10/2006 | Bishop et al. |
| 2006/0278704 A1 | 12/2006 | Saunders et al. |
| 2007/0107044 A1 | 5/2007 | Yuen et al. |
| 2007/0129955 A1 | 6/2007 | Dalmia et al. |
| 2007/0136193 A1 | 6/2007 | Starr |
| 2007/0136211 A1 | 6/2007 | Brown et al. |
| 2007/0170247 A1 | 7/2007 | Friedman |
| 2007/0179885 A1 | 8/2007 | Bird et al. |
| 2007/0208671 A1 | 9/2007 | Brown et al. |
| 2007/0245414 A1 | 10/2007 | Chan et al. |
| 2007/0288377 A1 | 12/2007 | Shaked |
| 2007/0291995 A1 | 12/2007 | Rivera |
| 2008/0015988 A1 | 1/2008 | Brown et al. |
| 2008/0029607 A1 | 2/2008 | Mullen |
| 2008/0035738 A1 | 2/2008 | Mullen |
| 2008/0052226 A1 | 2/2008 | Agarwal et al. |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan et al. |
| 2008/0065555 A1 | 3/2008 | Mullen |
| 2008/0201264 A1 | 8/2008 | Brown et al. |
| 2008/0201265 A1 | 8/2008 | Hewton |
| 2008/0228646 A1 | 9/2008 | Myers et al. |
| 2008/0243702 A1 | 10/2008 | Hart et al. |
| 2008/0245855 A1 | 10/2008 | Fein et al. |
| 2008/0245861 A1 | 10/2008 | Fein et al. |
| 2008/0255947 A1 | 10/2008 | Friedman |
| 2008/0283591 A1 | 11/2008 | Oder, II et al. |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown et al. |
| 2009/0010488 A1 | 1/2009 | Matsuoka et al. |
| 2009/0037333 A1 | 2/2009 | Flitcroft et al. |
| 2009/0037388 A1 | 2/2009 | Cooper et al. |
| 2009/0043702 A1 | 2/2009 | Bennett |
| 2009/0048971 A1 | 2/2009 | Hathaway et al. |
| 2009/0106112 A1 | 4/2009 | Dalmia et al. |
| 2009/0106160 A1 | 4/2009 | Skowronek |
| 2009/0134217 A1 | 5/2009 | Flitcroft et al. |
| 2009/0157555 A1 | 6/2009 | Biffle et al. |
| 2009/0159673 A1 | 6/2009 | Mullen et al. |
| 2009/0159700 A1 | 6/2009 | Mullen et al. |
| 2009/0159707 A1 | 6/2009 | Mullen et al. |
| 2009/0173782 A1 | 7/2009 | Muscato |
| 2009/0200371 A1 | 8/2009 | Kean et al. |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson et al. |
| 2009/0307139 A1 | 12/2009 | Mardikar et al. |
| 2009/0308921 A1 | 12/2009 | Mullen |
| 2009/0327131 A1 | 12/2009 | Beenau et al. |
| 2010/0008535 A1 | 1/2010 | Abulafia et al. |
| 2010/0088237 A1 | 4/2010 | Wankmueller |
| 2010/0094755 A1 | 4/2010 | Kloster |
| 2010/0106644 A1 | 4/2010 | Annan et al. |
| 2010/0120408 A1 | 5/2010 | Beenau et al. |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru et al. |
| 2010/0211505 A1 | 8/2010 | Saunders et al. |
| 2010/0223186 A1 | 9/2010 | Hogan et al. |
| 2010/0228668 A1 | 9/2010 | Hogan et al. |
| 2010/0235284 A1 | 9/2010 | Moore |
| 2010/0258620 A1 | 10/2010 | Torreyson et al. |
| 2010/0291904 A1 | 11/2010 | Musfeldt et al. |
| 2010/0299267 A1 | 11/2010 | Faith et al. |
| 2010/0306076 A1 | 12/2010 | Taveau et al. |
| 2010/0325041 A1 | 12/2010 | Berardi et al. |
| 2011/0010292 A1 | 1/2011 | Giordano et al. |
| 2011/0016047 A1 | 1/2011 | Wu et al. |
| 2011/0016320 A1 | 1/2011 | Bergsten et al. |
| 2011/0040640 A1 | 2/2011 | Erikson |
| 2011/0047076 A1 | 2/2011 | Carlson et al. |
| 2011/0083018 A1 | 4/2011 | Kesanupalli et al. |
| 2011/0087596 A1 | 4/2011 | Dorsey |
| 2011/0093397 A1 | 4/2011 | Carlson et al. |
| 2011/0125597 A1 | 5/2011 | Oder, II et al. |
| 2011/0153437 A1 | 6/2011 | Archer et al. |
| 2011/0153498 A1 | 6/2011 | Makhotin et al. |
| 2011/0154466 A1 | 6/2011 | Harper et al. |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park et al. |
| 2011/0238573 A1 | 9/2011 | Varadarajan |

(56) References Cited

U.S. PATENT DOCUMENTS

| | | |
|---|---|---|
| 2011/0246317 A1 | 10/2011 | Coppinger |
| 2011/0258111 A1 | 10/2011 | Raj et al. |
| 2011/0258123 A1 | 10/2011 | Dawkins et al. |
| 2011/0272471 A1 | 11/2011 | Mullen |
| 2011/0272478 A1 | 11/2011 | Mullen |
| 2011/0276380 A1 | 11/2011 | Mullen et al. |
| 2011/0276381 A1 | 11/2011 | Mullen et al. |
| 2011/0276424 A1 | 11/2011 | Mullen |
| 2011/0276425 A1 | 11/2011 | Mullen |
| 2011/0295745 A1 | 12/2011 | White et al. |
| 2011/0302081 A1 | 12/2011 | Saunders et al. |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien et al. |
| 2012/0041881 A1 | 2/2012 | Basu et al. |
| 2012/0047237 A1 | 2/2012 | Arvidsson et al. |
| 2012/0066078 A1 | 3/2012 | Kingston et al. |
| 2012/0072350 A1 | 3/2012 | Goldthwaite et al. |
| 2012/0078735 A1 | 3/2012 | Bauer et al. |
| 2012/0078798 A1 | 3/2012 | Downing et al. |
| 2012/0078799 A1 | 3/2012 | Jackson et al. |
| 2012/0095852 A1 | 4/2012 | Bauer et al. |
| 2012/0095865 A1 | 4/2012 | Doherty et al. |
| 2012/0116902 A1 | 5/2012 | Cardina et al. |
| 2012/0123882 A1 | 5/2012 | Carlson et al. |
| 2012/0123940 A1 | 5/2012 | Killian et al. |
| 2012/0129514 A1 | 5/2012 | Beenau et al. |
| 2012/0143767 A1 | 6/2012 | Abadir |
| 2012/0143772 A1 | 6/2012 | Abadir |
| 2012/0158580 A1 | 6/2012 | Eram et al. |
| 2012/0158593 A1 | 6/2012 | Garfinkle et al. |
| 2012/0173431 A1 | 7/2012 | Ritchie et al. |
| 2012/0185386 A1 | 7/2012 | Salama et al. |
| 2012/0197807 A1 | 8/2012 | Schlesser et al. |
| 2012/0203664 A1 | 8/2012 | Torossian et al. |
| 2012/0203666 A1 | 8/2012 | Torossian et al. |
| 2012/0215688 A1 | 8/2012 | Musser et al. |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain et al. |
| 2012/0246079 A1 | 9/2012 | Wilson et al. |
| 2012/0265631 A1 | 10/2012 | Cronic et al. |
| 2012/0271770 A1 | 10/2012 | Harris et al. |
| 2012/0297446 A1 | 11/2012 | Webb et al. |
| 2012/0300932 A1 | 11/2012 | Cambridge et al. |
| 2012/0303503 A1 | 11/2012 | Cambridge et al. |
| 2012/0303961 A1 | 11/2012 | Kean et al. |
| 2012/0304273 A1 | 11/2012 | Bailey et al. |
| 2012/0310725 A1 | 12/2012 | Chien et al. |
| 2012/0310831 A1 | 12/2012 | Harris et al. |
| 2012/0316992 A1 | 12/2012 | Oborne |
| 2012/0317035 A1 | 12/2012 | Royyuru et al. |
| 2012/0317036 A1 | 12/2012 | Bower et al. |
| 2013/0017784 A1 | 1/2013 | Fisher |
| 2013/0018757 A1 | 1/2013 | Anderson et al. |
| 2013/0019098 A1 | 1/2013 | Gupta et al. |
| 2013/0031006 A1 | 1/2013 | McCullagh et al. |
| 2013/0054337 A1 | 2/2013 | Brendell et al. |
| 2013/0054466 A1 | 2/2013 | Muscato |
| 2013/0054474 A1 | 2/2013 | Yeager |
| 2013/0081122 A1 | 3/2013 | Svigals et al. |
| 2013/0091028 A1 | 4/2013 | Oder, II et al. |
| 2013/0110658 A1 | 5/2013 | Lyman et al. |
| 2013/0111599 A1 | 5/2013 | Gargiulo |
| 2013/0117185 A1 | 5/2013 | Collison et al. |
| 2013/0124290 A1 | 5/2013 | Fisher |
| 2013/0124291 A1 | 5/2013 | Fisher |
| 2013/0124364 A1 | 5/2013 | Mittal |
| 2013/0124424 A1 | 5/2013 | Zloth et al. |
| 2013/0138525 A1 | 5/2013 | Bercaw |
| 2013/0144888 A1 | 6/2013 | Faith et al. |
| 2013/0145148 A1 | 6/2013 | Shablygin et al. |
| 2013/0145172 A1 | 6/2013 | Shablygin et al. |
| 2013/0159178 A1 | 6/2013 | Colon et al. |
| 2013/0159184 A1 | 6/2013 | Thaw |
| 2013/0166402 A1 | 6/2013 | Parento et al. |
| 2013/0166456 A1 | 6/2013 | Zhang et al. |
| 2013/0173474 A1 | 7/2013 | Ranganathan et al. |
| 2013/0173736 A1 | 7/2013 | Krzeminski et al. |
| 2013/0185202 A1 | 7/2013 | Goldthwaite et al. |
| 2013/0191286 A1 | 7/2013 | Cronic et al. |
| 2013/0191289 A1 | 7/2013 | Cronic et al. |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge et al. |
| 2013/0212007 A1 | 8/2013 | Mattsson et al. |
| 2013/0212017 A1 | 8/2013 | Bangia |
| 2013/0212019 A1 | 8/2013 | Mattsson et al. |
| 2013/0212024 A1 | 8/2013 | Mattsson et al. |
| 2013/0212026 A1 | 8/2013 | Powell et al. |
| 2013/0212666 A1 | 8/2013 | Mattsson et al. |
| 2013/0218698 A1 | 8/2013 | Moon et al. |
| 2013/0218769 A1 | 8/2013 | Pourfallah et al. |
| 2013/0219479 A1 | 8/2013 | DeSoto et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru et al. |
| 2013/0254102 A1 | 9/2013 | Royyuru |
| 2013/0254117 A1 | 9/2013 | von Mueller et al. |
| 2013/0262296 A1 | 10/2013 | Thomas et al. |
| 2013/0262302 A1 | 10/2013 | Lettow et al. |
| 2013/0262315 A1 | 10/2013 | Hruska |
| 2013/0262316 A1 | 10/2013 | Hruska |
| 2013/0262317 A1 | 10/2013 | Collinge et al. |
| 2013/0275300 A1 | 10/2013 | Killian et al. |
| 2013/0275307 A1 | 10/2013 | Khan |
| 2013/0275308 A1 | 10/2013 | Paraskeva et al. |
| 2013/0282502 A1 | 10/2013 | Jooste |
| 2013/0282575 A1 | 10/2013 | Mullen et al. |
| 2013/0282588 A1 | 10/2013 | Hruska |
| 2013/0297501 A1 | 11/2013 | Monk et al. |
| 2013/0297504 A1 | 11/2013 | Nwokolo et al. |
| 2013/0297508 A1 | 11/2013 | Belamant |
| 2013/0304648 A1 | 11/2013 | O'Connell et al. |
| 2013/0304649 A1 | 11/2013 | Cronic et al. |
| 2013/0308778 A1 | 11/2013 | Fosmark et al. |
| 2013/0311375 A1 | 11/2013 | Priebatsch |
| 2013/0311382 A1 | 11/2013 | Fosmark et al. |
| 2013/0317982 A1 | 11/2013 | Mengerink et al. |
| 2013/0332344 A1 | 12/2013 | Weber |
| 2013/0339253 A1 | 12/2013 | Sincai |
| 2013/0346222 A1 | 12/2013 | Ran |
| 2013/0346314 A1 | 12/2013 | Mogollon et al. |
| 2014/0007213 A1 | 1/2014 | Sanin et al. |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson et al. |
| 2014/0040139 A1 | 2/2014 | Brudnicki et al. |
| 2014/0040144 A1 | 2/2014 | Plomske et al. |
| 2014/0040145 A1 | 2/2014 | Ozvat et al. |
| 2014/0040628 A1 | 2/2014 | Fort et al. |
| 2014/0041018 A1 | 2/2014 | Bomar et al. |

(56) References Cited

U.S. PATENT DOCUMENTS

| | | |
|---|---|---|
| 2014/0046853 A1 | 2/2014 | Spies et al. |
| 2014/0047551 A1 | 2/2014 | Nagasundaram et al. |
| 2014/0052532 A1 | 2/2014 | Tsai et al. |
| 2014/0052620 A1 | 2/2014 | Rogers et al. |
| 2014/0052637 A1 | 2/2014 | Jooste et al. |
| 2014/0068706 A1 | 3/2014 | Aissi |
| 2014/0074637 A1 | 3/2014 | Hammad |
| 2014/0081862 A1 | 3/2014 | Patterson |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0294701 A1 | 10/2014 | Dai et al. |
| 2014/0297534 A1 | 10/2014 | Patterson |
| 2014/0310183 A1 | 10/2014 | Weber |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0046338 A1 | 2/2015 | Laxminarayanan et al. |
| 2015/0046339 A1 | 2/2015 | Wong et al. |
| 2015/0052064 A1 | 2/2015 | Karpenko et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0120536 A1 | 4/2015 | Talker |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2016/0028550 A1 | 1/2016 | Gaddam et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0103675 A1 | 4/2016 | Aabye et al. |
| 2016/0119296 A1 | 4/2016 | Laxminarayanan et al. |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1 | 6/2016 | Prakash et al. |
| 2016/0173483 A1 | 6/2016 | Wong et al. |
| 2016/0224976 A1 | 8/2016 | Basu et al. |
| 2017/0046696 A1 | 2/2017 | Powell et al. |
| 2017/0103387 A1 | 4/2017 | Weber |
| 2017/0220818 A1 | 8/2017 | Nagasundaram et al. |
| 2017/0228723 A1 | 8/2017 | Taylor et al. |

FOREIGN PATENT DOCUMENTS

| | | |
|---|---|---|
| CN | 103780396 A | 5/2014 |
| CN | 104252590 A | 12/2014 |
| CN | 107004192 A | 8/2017 |
| EP | 2156397 A1 | 2/2010 |
| EP | 3224784 | 10/2017 |
| RU | 2376635 C2 | 12/2009 |
| RU | 2708945 C2 | 12/2019 |
| SG | 11201702763 T | 8/2018 |
| WO | 0135304 A1 | 5/2001 |
| WO | 0135304 A9 | 5/2002 |
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |
| WO | 2016086154 | 6/2016 |

OTHER PUBLICATIONS

Application No. EP15862269.6, Office Action, Mailed On Jun. 6, 2023, 12 pages.

"Petition for Inter Partes Review of U.S. Pat. No. 8,533,860 Challenging Claims 1-30 Under 35 U.S.C. § 312 and 37 C.F.R. § 42.104", USPTO Patent Trial and Appeal Board, IPR 2016-00600, Feb. 17, 2016, 65 pages.

U.S. Appl. No. 14/600,523, Secure Payment Processing Using Authorization Request, filed Jan. 20, 2015, 42 pages.

U.S. Appl. No. 15/008,388, Methods for Secure Credential Provisioning, filed Jan. 27, 2016, 90 pages.

U.S. Appl. No. 15/011,366, Token Check Offline, filed Jan. 29, 2016, 60 pages.

U.S. Appl. No. 15/019,157, Token Processing Utilizing Multiple Authorizations, filed Feb. 9, 2016, 62 pages.

U.S. Appl. No. 15/041,495, Peer Forward Authorization of Digital Requests, filed Feb. 11, 2016, 63 pages.

U.S. Appl. No. 15/265,282, Self-Cleaning Token Valut, filed Sep. 14, 2016, 52 pages.

U.S. Appl. No. 15/462,658, Replacing Token On a Multi-Token User Device, filed Mar. 17, 2017, 58 pages.

U.S. Appl. No. 61/738,832, Management of Sensitive Data, filed Dec. 18, 2012, 22 pages.

U.S. Appl. No. 61/751,763, Payments Bridge, filed Jan. 11, 2013, 64 pages.

U.S. Appl. No. 61/879,632, Systems and Methods for Managing Mobile Cardholder Verification Methods, filed Sep. 18, 2013, 24 pages.

U.S. Appl. No. 61/892,407, Issuer Over-The-Air Update Method and System, filed Oct. 17, 2013, 28 pages.

U.S. Appl. No. 61/894,749, Methods and Systems for Authentication and Issuance of Tokens in a Secure Environment, filed Oct. 23, 2013, 67 pages.

U.S. Appl. No. 61/926,236, Methods and Systems for Provisioning Mobile Devices With Payment Credentials and Payment Token Identifiers, filed Jan. 10, 2014, 51 pages.

U.S. Appl. No. 62/000,288, Payment System Canonical Address Format, filed May 19, 2014, 58 pages.

U.S. Appl. No. 62/003,717, Mobile Merchant Application, filed May 28, 2014, 58 pages.

U.S. Appl. No. 62/024,426, Secure Transactions Using Mobile Devices, filed Jul. 14, 2014, 102 pages.

U.S. Appl. No. 62/037,033, Sharing Payment Token, filed Aug. 13, 2014, 36 pages.

U.S. Appl. No. 62/038,174, Customized Payment Gateway, filed Aug. 15, 2014, 42 pages.

U.S. Appl. No. 62/042,050, Payment Device Authentication and Authorization System, filed Aug. 26, 2014, 120 pages.

U.S. Appl. No. 62/053,736, Completing Transactions Without a User Payment Device, filed Sep. 22, 2014, 31 pages.

(56) References Cited

OTHER PUBLICATIONS

U.S. Appl. No. 62/054,346, Mirrored Token Vault, filed Sep. 23, 2014, 38 pages.
U.S. Appl. No. 62/103,522, Methods and Systems for Wallet Provider Provisioning, filed Jan. 14, 2015, 39 pages.
U.S. Appl. No. 62/108,403, Wearables With NFC HCE, filed Jan. 27, 2015, 32 pages.
U.S. Appl. No. 62/117,291, Token and Cryptogram Using Transaction Specific Information, filed Feb. 17, 2015, 25 pages.
U.S. Appl. No. 62/128,709, Tokenizing Transaction Amounts, filed Mar. 5, 2015, 30 pages.
Application No. CN201580064121.5, Notice of Decision to Grant, Mailed On May 25, 2021, 4 pages.
Application No. CN201580064121.5, Office Action, Mailed On Dec. 23, 2020, 21 pages.
Application No. CN201580064121.5, Office Action, Mailed On Sep. 8, 2020, 23 pages.
Application No. CN201580064121.5, Office Action, Mailed On Mar. 4, 2020, 24 pages.
Application No. EP15862269.6, Extended European Search Report, Mailed On Oct. 11, 2017, 8 pages.
Application No. EP15862269.6, Office Action, Mailed On Mar. 12, 2020, 6 pages.
Application No. EP15862269.6, Office Action, Mailed On Jul. 30, 2021, 8 pages.
Isaac et al., "Secure Mobile Payment Systems", IEEE Computer Society, vol. 16, No. 3, May-Jun. 2014, pp. 36-43.
Application No. PCT/US2015/062716, International Preliminary Report on Patentability, Mailed On Jun. 8, 2017, 8 pages.
Application No. PCT/US2015/062716, International Search Report and Written Opinion, Mailed On Mar. 28, 2016, 11 pages.
Application No. RU2017122090, Notice of Decision to Grant, Mailed On Sep. 25, 2019, 14 pages.
Application No. RU2017122090, Office Action, Mailed On Apr. 29, 2019, 13 pages.
Application No. SG11201702763T, Notice of Decision to Grant, Mailed On Jul. 5, 2018, 6 pages.
Application No. SG11201702763T, PCT Written Opinion, Mailed On Dec. 1, 2017, 7 pages.
Application No. CN202110863976.1, Notice of Decision to Grant, Mailed On Mar. 1, 2024, 6 pages.

TOKENIZATION REQUEST VIA ACCESS DEVICE

CROSS REFERENCE TO RELATED APPLICATIONS

This application is a continuation application of U.S. application Ser. No. 14/952,444, filed Nov. 25, 2015, which is a non-provisional application of and claims the benefit of the filing date of U.S. Provisional Application No. 62/084,738, filed on Nov. 26, 2014, which is herein incorporated by reference in its entirety for all purposes.

BACKGROUND

Tokens can be used to protect sensitive information, such as account numbers. For example, tokens may only be valid under certain circumstances, such that if a token is compromised may not pose a security threat.

However, current mechanisms for obtaining tokens are limited. For example, a mobile device may require wireless communication connectivity in order to obtain a token over the air for a specific transaction. Thus, if a mobile device is in a zone without wireless communication coverage, the mobile device may not be able to obtain a token. If the mobile device is not able to obtain a token, then an intended transaction may not be consummated. Or, the mobile device may resort to using the sensitive information to conduct the transaction, which is undesirable.

Embodiments of the invention address these and other problems individually and collectively.

SUMMARY

Embodiments of the invention are directed to obtaining tokens for transactions through alternative communication channels.

One embodiment of the invention is directed to a method. The method comprises receiving, at a first computer, a credential from a user, and sending a token request message including the credential to a second computer. The token request message is in the same format as an authorization request message used to authorize a transaction. The method further comprises receiving a token associated with the credential from the second computer, generating the authorization request message, and submitting the authorization request message including the token to an authorization computer for the transaction.

Another embodiment of the invention is directed to a first computer configured to perform the above-described method.

Another embodiment of the invention is directed to a method comprising receiving, at a second computer, a token request message including a credential from a first computer. The token request message has the same format as an authorization request message used to authorize a transaction. The method further comprises validating the token request message, assigning a token to the credential, and generating a token response message including the token. The token response message has the same format as an authorization response message. The method also comprises transmitting the token response message to the first computer.

Another embodiment of the invention is directed to a second computer configured to perform the above-described method.

Further details regarding embodiments of the invention can be found in the Detailed Description and the Figures.

DETAILED DESCRIPTION

Figure 1:
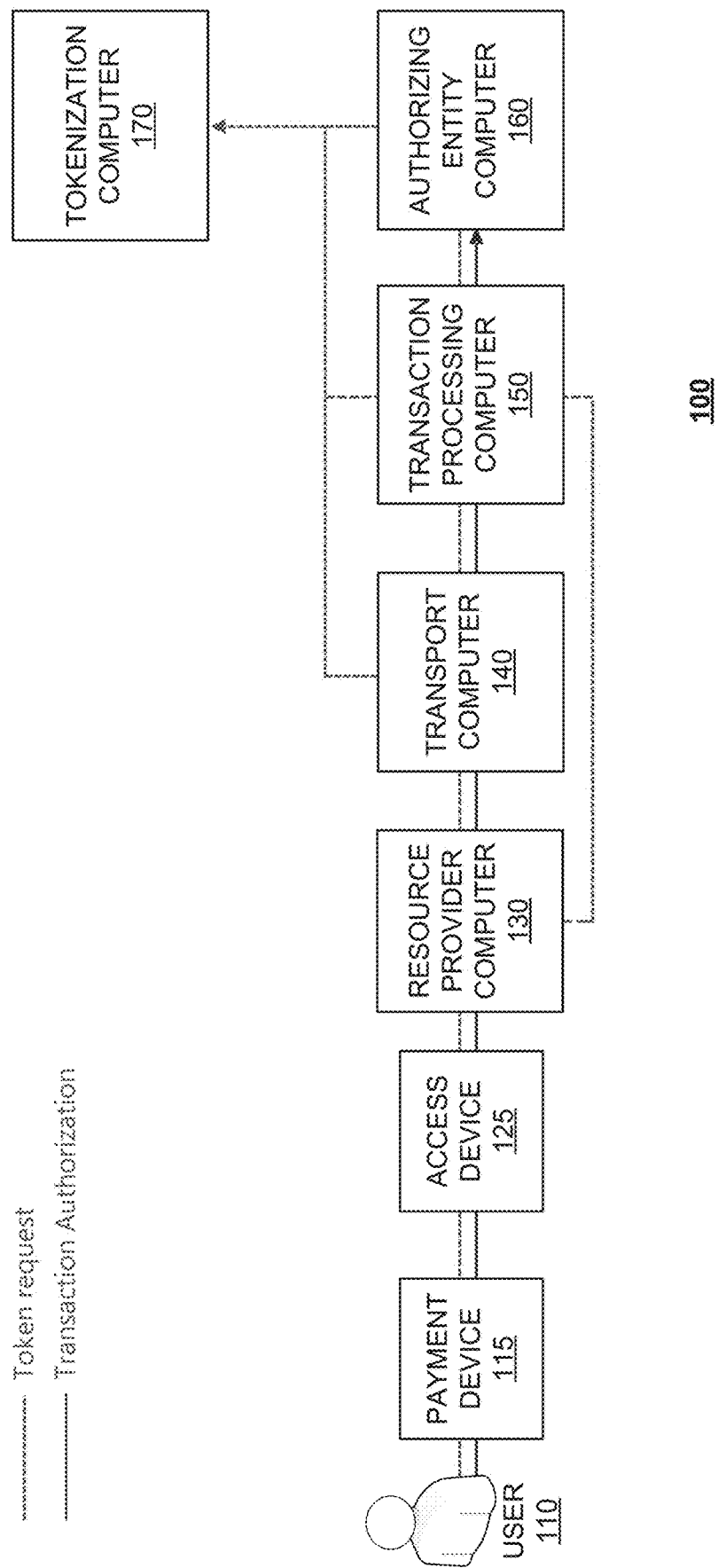
FIG. 1 shows a block diagram of a system for obtaining a payment token for a payment device, according to an embodiment of the invention.

Embodiments of the present invention are directed to requesting a payment token via a merchant access device. A user can present a payment device at an access device during a transaction. The payment device can then pass payment credentials to the access device. The payment credentials may then be sent by the access device in a token request message that is in the form of an authorization request message to a tokenization computer. The tokenization computer can respond with a token response message including a payment token that is associated with the payment credentials. The token response message may be in the form of an authorization response message. After the access device receives the payment token, it can be used to conduct the transaction instead of the payment credentials.

Some embodiments of the invention can advantageously allow normal magnetic stripe or chip type payment cards to request a payment tokens.

Some embodiments of the invention permit mobile device to obtain payment tokens via access devices. A payment token can be retrieved for a mobile device in the same manner as described above (e.g., transmit payment credentials from the mobile device to the access device, and access device sends a token request to a tokenization computer). Alternatively, the mobile device can generate the token request message and transmit the message to the access device, and then the access device can forward the token request message to the tokenization computer. Accordingly, a mobile device can obtain a payment token even when the mobile device is not in direct communication with the tokenization computer over the air.

Storing payment tokens on a payment device or mobile device can cause a security vulnerability, as the payment tokens may be compromised if the device is stolen or hacked. Instead of storing payment tokens, some embodiments of the invention allow tokens to be retrieved only when they are needed (e.g., during a transaction). Further, the payment tokens can have a short lifespan, as they may be used immediately. Accordingly, the risk of payment tokens being compromised is reduced, and any payment tokens that are stolen or lost may not pose a security threat (e.g., because they may be no longer valid). Further, the security of requesting and providing payment tokens can be improved, as secure authorization-related encryption techniques and secure communications can be utilized.

Embodiments of the invention, as discussed herein, will primarily be described as pertaining to financial transactions and payment systems. However, embodiments of the invention can also be used in other systems. Several examples exist of applications for which it can be advantageous to use the connectivity of an access point to obtain a token instead of an over-the-air connection.

In one example, instead of obtaining a payment token via an access device for a payment transaction, it may be useful to obtain access tokens via an access point for gaining access at the access point. Access tokens can be used for physical entry into a secure area, or for digital access to secure data (e.g., an email inbox, a secure database, a restricted webpage, etc.). For example, a user may have an access card (e.g., a readable badge or mobile device) that includes access credentials for entering a restricted area. It may be desirable to protect the user's access credentials by instead utilizing an access token that represents the access credentials.

Some embodiments allow access tokens to be retrieved when the user presents the access card at an access point (e.g., an access device that may control access to a restricted area). The access point may receive the access credentials from the access card, send a token request message with the access credentials, and obtain an access token associated with the access credentials. The access point can then use the access token for determining whether to allow access to the user, and/or the access point can store the access token (e.g., instead of the access credential) in a database that records who has entered the secure area. In some embodiments, the user's access card or other access device may be able to store access tokens. Accordingly, an access token may be stored for use at a later time. Accordingly, embodiments of the invention allow for protection of any suitable type of sensitive information by allowing for an suitable type of token to be requested and obtained.

Prior to discussing specific embodiments of the invention, some terms may be described in detail.

A "mobile device" may comprise any suitable electronic device that may be transported and operated by a user, which may also provide remote communication capabilities to a network. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile devices include mobile phones (e.g. cellular phones), PDAs, tablet computers, net books, laptop computers, personal music players, hand-held specialized readers, etc. Further examples of mobile devices include wearable devices, such as smart watches, fitness bands, ankle bracelets, rings, earrings, etc., as well as automobiles with remote communication capabilities. A mobile device may comprise any suitable hardware and software for performing such functions, and may also include multiple devices or components (e.g. when a device has remote access to a network by tethering to another device—i.e. using the other device as a modem—both devices taken together may be considered a single mobile device).

A "payment device" may include any suitable device that may be used to conduct a financial transaction, such as to provide payment credentials to a merchant. The payment device may be a software object, a hardware object, or a physical object. As examples of physical objects, the payment device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device. A payment device may be associated with a value such as a monetary value, a discount, or store credit, and a payment device may be associated with an entity such as a bank, a merchant, a payment processing network, or a person. A payment device may be used to make a payment transaction. Suitable payment devices can be hand-held and compact so that they can fit into a user's wallet and/or pocket (e.g., pocket-sized). Example payment devices may include smart cards, magnetic stripe cards, keychain devices (such as the Speedpass™ commercially available from Exxon-Mobil Corp.), etc. Other examples of mobile devices include pagers, payment cards, security cards, access cards, smart media, transponders, and the like. If the payment device is in the form of a debit, credit, or smartcard, the payment device may also optionally have features such as magnetic stripes. Such devices can operate in either a contact or contactless mode. In some embodiments, a mobile device can function as a payment device (e.g., a mobile device can store and be able to transmit payment credentials for a transaction).

A "credential" may be any suitable information that serves as reliable evidence of worth, ownership, identity, or authority. A credential may be a string of numbers, letters, or any other suitable characters that may be present or contained in any object or document that can serve as confirmation.

A "value credential" may be information associated with worth. Examples of value credentials include payment credentials, coupon identifiers, information needed to obtain a promotional offer, etc.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). Payment credentials may be any information that identifies or is associated with a payment account. Payment credentials may be provided in order to make a payment from a payment account. Payment credentials can also include a user name, an expiration date, a gift card number or code, and any other suitable information.

An "application" may be computer code or other data stored on a computer readable medium (e.g. memory element or secure element) that may be executable by a processor to complete a task.

A "digital wallet" can include an electronic device that allows an individual to conduct electronic commerce transactions. A digital wallet may store user profile information, payment credentials, bank account information, one or more digital wallet identifiers and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like. A digital wallet may be designed to streamline the purchase and payment process. A digital wallet may allow the user to load one or more payment cards onto the digital wallet so as to make a payment without having to enter an account number or present a physical card.

A "digital wallet provider" may include an entity, such as an issuing bank or third party service provider, that issues a digital wallet to a user that enables the user to conduct financial transactions. A digital wallet provider may provide standalone user-facing software applications that store account numbers, or representations of the account numbers (e.g., payment tokens), on behalf of a cardholder (or other user) to facilitate payments at more than one unrelated merchant, perform person-to-person payments, or load financial value into the digital wallet. A digital wallet provider may enable a user to access its account via a personal computer, mobile device or access device. Additionally, a digital wallet provider may also provide one or more of the following functions: storing multiple payment cards and other payment products on behalf of a user, storing other information including billing address, shipping addresses, and transaction history, initiating a transaction by one or more methods, such as providing a user name and password, NFC or a physical token, and may facilitate pass-through or two-step transactions.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which data is replaced with substitute data. For example, a payment account identifier (e.g., a primary account number (PAN)) may be tokenized by replacing the primary account identifier with a substitute number (e.g. a token) that may be associated with the payment account identifier. Further, tokenization may be applied to any other information that may be replaced with a substitute value (i.e., token). Tokenization may be used to enhance transaction efficiency, improve transaction security, increase service transparency, or to provide a method for third-party enablement.

A "token provider" or "token service system" can include a system that that services payment tokens. In some embodiments, a token service system can facilitate requesting, determining (e.g., generating) and/or issuing tokens, as well as maintaining an established mapping of tokens to primary account numbers (PANs) in a repository (e.g. token vault). In some embodiments, the token service system may establish a token assurance level for a given token to indicate the confidence level of the token to PAN binding. The token service system may include or be in communication with a token vault where the generated tokens are stored. The token service system may support token processing of payment transactions submitted using tokens by de-tokenizing the token to obtain the actual PAN. In some embodiments, a token service system may include a tokenization computer alone, or in combination with other computers such as a transaction processing network computer. Various entities of a tokenization ecosystem may assume the roles of the token service provider. For example, payment networks and issuers or their agents may become the token service provider by implementing the token services according to embodiments of the present invention.

A "token domain" may indicate an area and/or circumstance in which a token can be used. Examples of the token domain may include, but are not limited to, payment channels (e.g., e-commerce, physical point of sale, etc.), POS entry modes (e.g., contactless, magnetic stripe, etc.), and merchant identifiers to uniquely identify where the token can be used. A set of parameters (i.e. token domain restriction controls) may be established as part of token issuance by the token service provider that may allow for enforcing appropriate usage of the token in payment transactions. For example, the token domain restriction controls may restrict the use of the token with particular presentment modes, such as contactless or e-commerce presentment modes. In some embodiments, the token domain restriction controls may restrict the use of the token at a particular merchant that can be uniquely identified. Some exemplary token domain restriction controls may require the verification of the presence of a token cryptogram that is unique to a given transaction. In some embodiments, a token domain can be associated with a token requestor.

"Token expiry date" may refer to the expiration date/time of the token. The token expiry date may be passed among the entities of the tokenization ecosystem during transaction processing to ensure interoperability. The token expiration date may be a numeric value (e.g. a 4-digit numeric value). In some embodiments, the token expiry date can be expressed as an time duration as measured from the time of issuance.

A "token request message" may be an electronic message for requesting a token. A token request message may include information usable for identifying a payment account or digital wallet, and/or information for generating a payment token. For example, a token request message may include payment credentials, mobile device identification information (e.g. a phone number or MSISDN), a digital wallet identifier, information identifying a tokenization service provider, a merchant identifier, a cryptogram, and/or any other suitable information. Information included in a token request message can be encrypted (e.g., with an issuer-specific key). In some embodiments, a token request message may be formatted as an authorization request message (e.g., an ISO 8583 message format). In some embodiments, the token request message may have a zero dollar amount in an authorization amount field. As another example, the token request message may include a flag or other indicator specifying that the message is a token request message.

A "token response message" may be a message that responds to a token request. A token response message may include an indication that a token request was approved or denied. A token response message may also include a payment token, mobile device identification information (e.g. a phone number or MSISDN), a digital wallet identifier, information identifying a tokenization service provider, a merchant identifier, a cryptogram, and/or any other suitable information. Information included in a token response message can be encrypted (e.g., with an issuer-specific key). In some embodiments, a token response message may be formatted as an authorization response message (e.g., an ISO 8583 message format). In some embodiments, the token response message may have a zero dollar amount in an authorization amount field. As another example, the token response message may include a flag or other indicator specifying that the message is a token response message.

A "user" may include an individual. In some embodiments, a user may be associated with one or more personal accounts and/or mobile devices. The user may also be referred to as a cardholder, account holder, or consumer.

A "resource provider" may be an entity that can provide a resource such as goods, services, information, and/or access. Examples of a resource provider includes merchants, access devices, secure data access points, etc. A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization. As noted above, in some embodiments, a transaction processing computer may generate or forward the authorization response message to the merchant.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

FIG. 1 shows a system 100 comprising a number of components. The system 100 comprises a payment device 115 which may be associated with a user 110 and may be able to provide payment credentials to an access device 125. The access device 125 may be associated and in communication with a resource provider computer 130. Further, the resource provider computer 130, a transport computer 140, a transaction processing computer 150, an issuer computer 160, and/or a tokenization computer 170 may all be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

The user 110 may be able to use the payment device 115 to conduct transactions with a resource provider associated with the resource provider computer 130. The payment device 115 may store information associated with the user 110 and/or a payment account. For example, the payment device 115 may store payment credentials as well as personal information such as a name, address, email address, phone number, or any other suitable user 110 identification information. The payment device 115 may provide this information to the access device 125 during a transaction.

Figure 2:
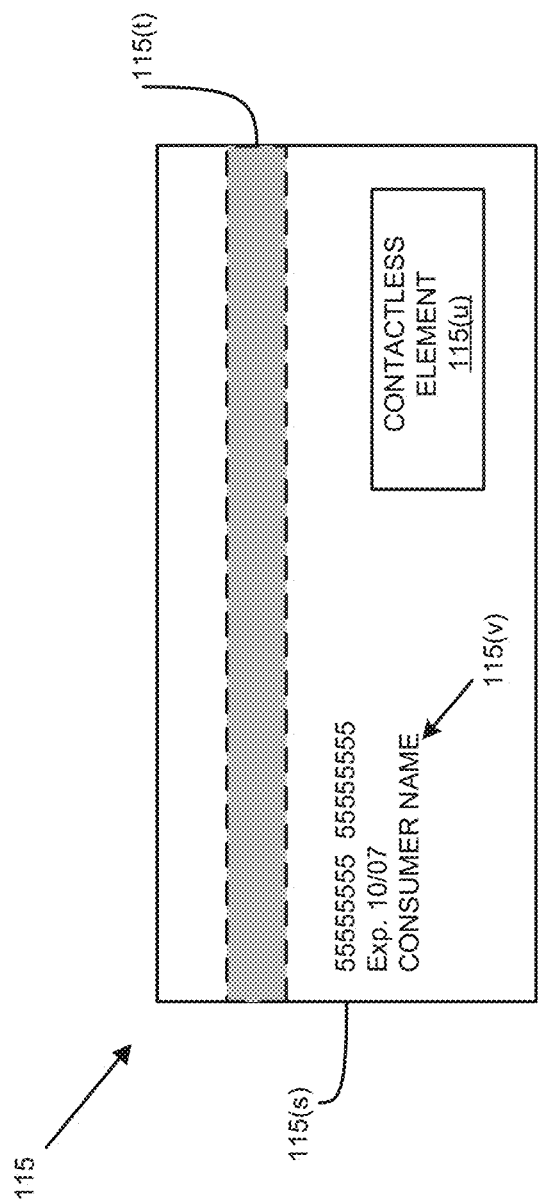
FIG. 2 shows a block diagram of an exemplary payment device according to an embodiment of the invention.

FIG. 2 shows an example of a payment device 115 in the form of a card. As shown, the payment device 115 comprises a plastic substrate 115(s). In some embodiments, a contactless element 115(u) for interfacing with an access device may be present on, or embedded within, the plastic substrate 115(s). A magnetic stripe 115(t) may also or alternatively be on the plastic substrate 115(s). User information 115(v) such as an account number, expiration date, and/or a user name may be printed or embossed on the card. In some embodiments, the payment device 115 may comprise a microprocessor and/or memory chips with user data stored in them.

Referring back to FIG. 1, the resource provider computer 130 may be associated with a resource provider. The resource provider may engage in transactions, sell goods or services, or provide access to goods or services to the user 110. The resource provider may accept multiple forms of payment (e.g. the payment device 115) and may use multiple tools to conduct different types of transactions. For example, the resource provider may operate a physical store and use the access device 125 for in-person transactions. The resource provider may also sell goods and/or services via a website, and may accept payments over the Internet. In some embodiments, the resource provider computer 130 may also be able to request payment tokens associated with the user's payment credentials.

Figure 3:
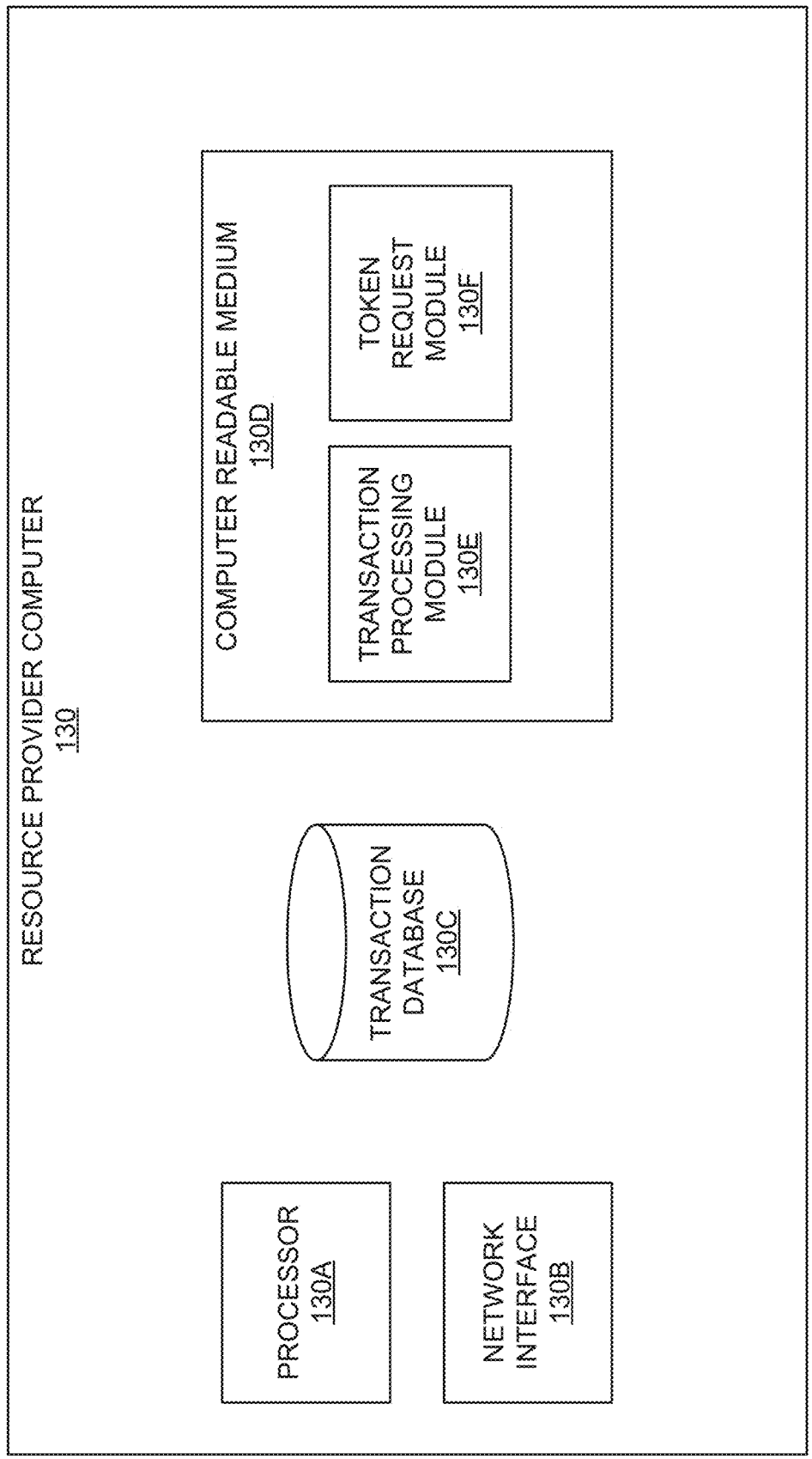
FIG. 3 shows a block diagram of a resource provider computer according to an embodiment of the invention.

An example of the resource provider computer 130, according to some embodiments of the invention, is shown in FIG. 3. The resource provider computer 130 comprises a processor 130A, a network interface 130B, a transaction database 130C, and a computer readable medium 130D.

The computer readable medium 130D may comprise a transaction processing module 130E, a token request module 130F, and any other suitable software module. The computer readable medium 130D may also comprise code, executable by the processor 130A for implementing a method comprising receiving, by a first computer, a credential from a user; sending a token request message including the credential to a second computer, the token request message being in the same format as an authorization request message used to authorize a transaction; receiving a token associated with the credential from the second computer; generating the authorization request message; and submitting the authorization request message including the token to an authorization computer for the transaction.

The transaction processing module 130E may comprise code that causes the processor 130A to process transactions. For example, the transaction processing module 130E may contain logic that causes the processor 130A to receive payment credentials from the user 110 (e.g., via the access device 125 and the payment device 115) for a transaction. The transaction processing module 130E may be able to initiate a transaction authorization process, and may also be able to finalize a transaction so that goods and/or services can be released. In some embodiments, instead of submitting payment credentials in an authorization request upon receipt, the transaction processing module 130E may first instruct the token request module 130F to obtain a payment token, and then the transaction processing module 130E may include the payment token in the authorization request message. The transaction processing module 130E may also be able to generate transaction receipts and store transaction records (e.g., including transaction data, user information, a payment token, etc.) in the transaction database 130C. In some embodiments, it may be beneficial to store a payment token in the transaction record instead of the user's payment credentials, as the potential of the payment credentials being compromised may thereby be reduced.

The token request module 130F may comprise code that causes the processor 130A to request and receive payment tokens. For example, the token request module 130F may contain logic that causes the processor 130A to send a token request message to a token provider. The token request message may include the user's payment credentials, resource provider identification information, and any other suitable information. The token request message may be formatted as an authorization request message, and may be transmitted along the same communication pathways as an authorization request message (e.g., it may be initially sent to the transport computer 140).

Referring back to FIG. 1, in some embodiments, the access device 125 may alternatively be configured to initiate tokenization of payment credentials. For example, the access device 125 may be able to generate a token request message and send the token request message to an appropriate tokenization entity.

Authorization requests submitted by the resource provider computer 130 or the access device 125 may be sent to the transport computer 140 (which may be an acquirer computer). The transport computer 140 may be associated with the resource provider computer 130, and may manage authorization requests on behalf of the resource provider computer 130. The transport computer 140 may also handle token request messages on behalf of the resource provider computer 130. For example, in some embodiments, the transport computer 140 may receive and forward token request messages in the same manner as authorization request messages.

As shown in FIG. 1, the transaction processing computer 150 may be disposed between the transport computer 140 and the authorizing entity computer 160. The transaction processing computer 150 may include data processing subsystems, networks, and operations used to support and deliver authorization services, exception file services, and clearing and settlement services. For example, the transaction processing computer 150 may comprise a server coupled to a network interface (e.g., by an external communication interface), and databases of information. The transaction processing computer 150 may be representative of a transaction processing network. An exemplary transaction processing network may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The transaction processing computer 150 may use any suitable wired or wireless network, including the Internet.

Figure 4:
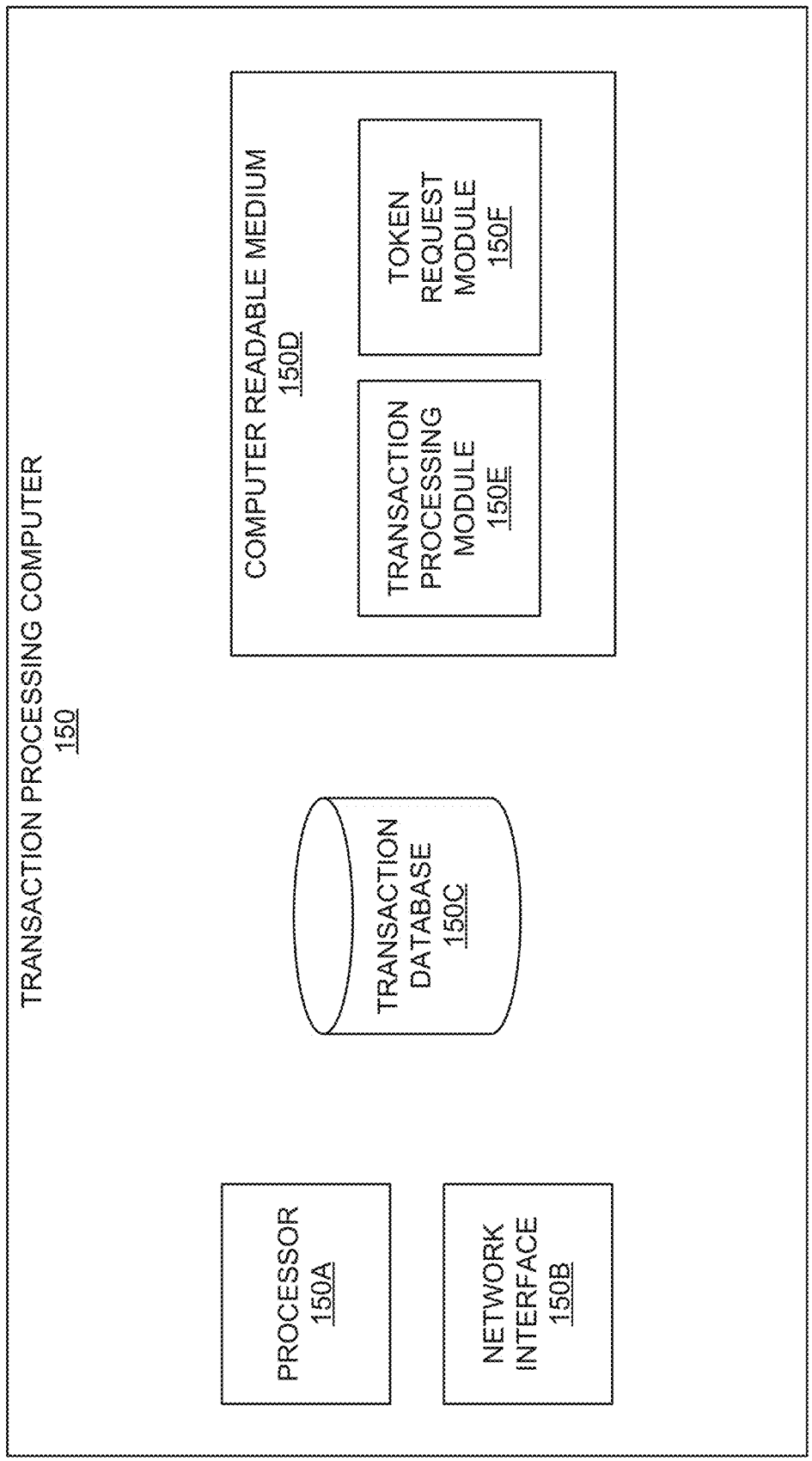
FIG. 4 shows a block diagram of a transaction processing computer according to an embodiment of the invention.

An example of the transaction processing computer 150, according to some embodiments of the invention, is shown in FIG. 4. The transaction processing computer 150 comprises a processor 150A, a network interface 150B, a transaction database 150C, and a computer readable medium 150D.

The computer readable medium 150D may comprise a transaction processing module 150E, a token request module 150F, and any other suitable software module. The computer readable medium 150D may also comprise code, executable by the processor 150A for implementing a method comprising receiving, by a transaction processing computer, a token request message including a credential (e.g., a value credential) from a first computer, wherein the token request message is in the same format as an authorization request message used to authorize a transaction; transmitting the token request message to a second computer; receiving a token response message including a token associated with the credential from the second computer, wherein the token response message is in the same format as an authorization response message; transmitting the token response message to the first computer; receiving the authorization request message from the first computer for the transaction, the authorization request message including the token; transmitting the authorization request message to an authorization computer; receiving the authorization response message from the authorization computer, the authorization response message indicating that the transaction is authorized; and transmitting the authorization response message to the first computer.

The transaction processing module 150E may comprise code that causes the processor 150A to process transactions. For example, the transaction processing module 150E may contain logic that causes the processor 150A to analyze transaction risk, and to forward, authorize, or reject authorization request messages for payment transactions. The transaction processing module 150E may also be able to store transaction records in the transaction database 150C. For example, the transaction database 150C may include a record of each completed transaction that includes transaction details (e.g. items purchased, amount, timestamp), resource provider information, user 110 information (e.g. a name, a phone number and/or other contact information, a payment token, an expiration date, etc.), and/or any other suitable information.

The token request module 150F may comprise code that causes the processor 150A to process token requests. For example, the token request module 150F may contain logic that causes the processor 150A to receive and forward token request messages and token response messages. In some embodiments, the token request module 150F may handle token request messages similarly to authorization request messages. For example, the token request module 150F may receive a token request message from the transport computer 140, identify a set of payment credentials within the message, identify an authorizing entity associated with the payment credentials, and then forward the token request message to the authorizing entity computer 160. Thus token request messages may be forwarded to the authorizing entity computer 160 or another relevant tokenization entity along the same communication channels as an authorization request message.

Referring back to FIG. 1, the transaction processing computer 150, the transport computer 140, and the authorizing entity computer 160 may operate suitable routing tables to route authorization request messages and/or token request messages using payment credentials, payment tokens, and/or other suitable identifiers.

The authorizing entity computer 160 may issue and manage a payment account and an associated payment device 115 of the user 110. The authorizing entity computer 160 may be able authorize transactions that involve the payment account. Before authorizing a transaction, the authorizing entity computer 160 may authenticate payment credentials received in the authorization request, and check that there is available credit or funds in an associated payment account. The authorizing entity computer 160 may also receive and/or determine a risk level associated with the transaction, and may weigh the risk when deciding whether or not to authorize the transaction. If the authorizing entity computer 160 receives an authorization request that includes a payment token, the authorizing entity computer 160 may be able to de-tokenize the payment token in order to obtain the associated payment credentials.

The tokenization computer 170 (which may also be referred to as a "token provider computer") may be able to provide payment tokens. For example, a token request message may be sent to the tokenization computer 170, and the tokenization computer 170 may then generate and/or associate a payment token with payment credentials in the token request message. In embodiments, tokenization services may be provided by the authorizing entity computer 160, the transaction processing computer 150, the transport computer 140, a third-party service provider, or any other suitable entity. Thus, the tokenization computer 170 may be incorporated as a part of another entity in the system 100. In some embodiments, as shown in FIG. 1, the tokenization computer 170 may be a separate entity.

Figure 5:
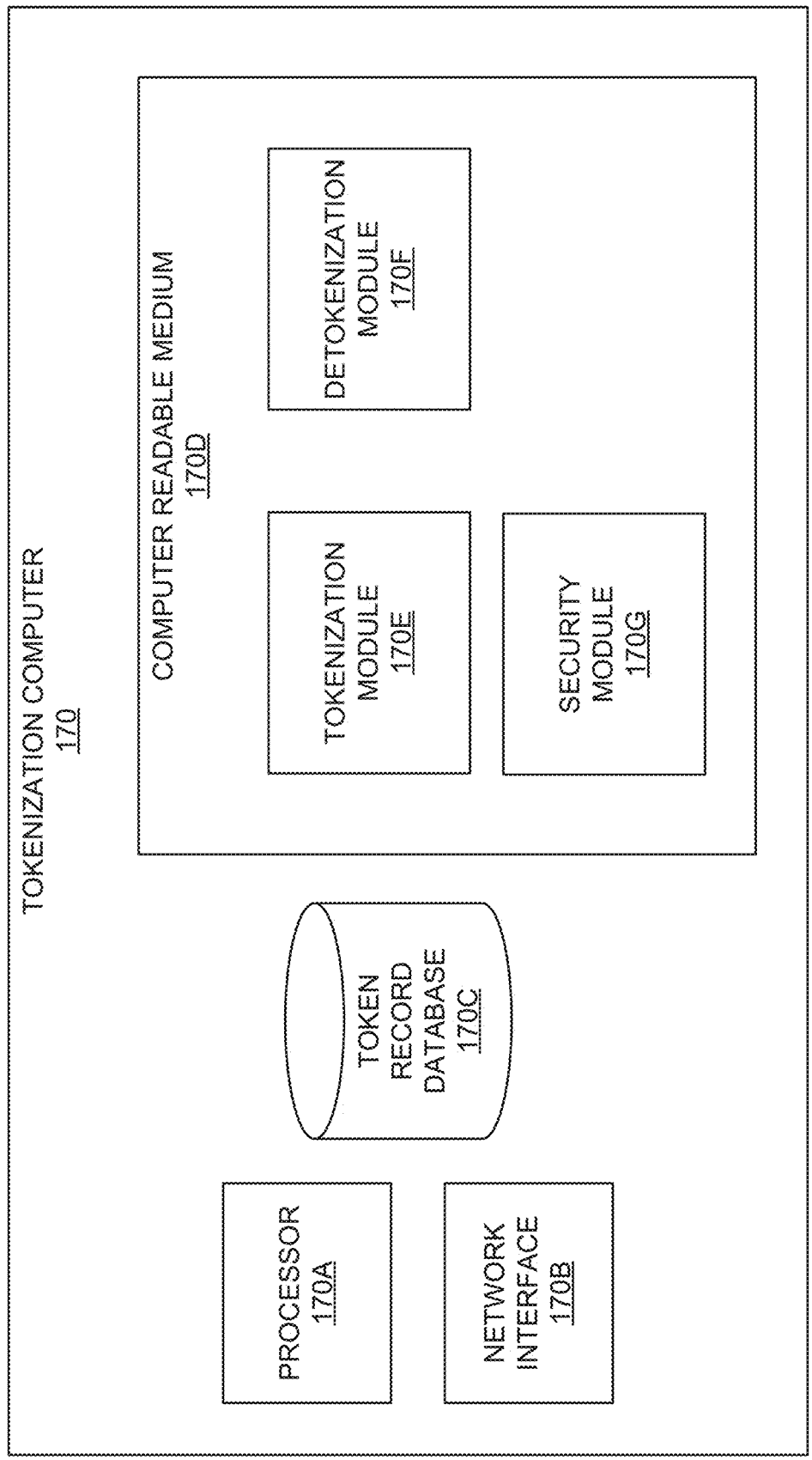
FIG. 5 shows a block diagram of a tokenization computer according to an embodiment of the invention.

An example of the tokenization computer 170, according to some embodiments of the invention, is shown in FIG. 5. The tokenization computer 170 comprises a processor 170A, a network interface 170B, a token record database 170C, and a computer readable medium 170D.

The computer readable medium 170D may comprise a tokenization module 170E, a detokenization module 170F, a security module 170G, and any other suitable software module. The computer readable medium 170D may also comprise code, executable by the processor 170A for implementing a method comprising receiving, at a second computer, a token request message including a credential from a first computer, the token request message being in the same format as an authorization request message used to authorize a transaction; validating the token request message; assigning a token to the credential; generating a token response message including the token, the token response message being in the same format as an authorization response message; and transmitting the token response message to the first computer.

The tokenization module 170E may comprise code that causes the processor 170A to provide payment tokens. For example, the tokenization module 170E may contain logic that causes the processor 170A to generate a payment token and/or associate the payment token with a set of payment credentials. A token record may then be stored in the token record database 170C indicating that the payment token is associated with a certain user 110 or a certain set of payment credentials. The tokenization module 170E may be able to send a token response message including the payment token along communication rails normally used for authorization response messages.

The detokenization module 170F may comprise code that causes the processor 170A to detokenize payment tokens. For example, the detokenization module 170F may contain logic that causes the processor 170A to identify a token record associated with a payment token in the token record database 170C. A set of payment credentials associated with the payment token (as indicated in the token record) can then be identified. In some embodiments, the detokenization module 170F may detokenize a payment token in response to a detokenization request message (e.g., received from the authorization entity computer 160, the transaction processing computer 150, or any other suitable entity).

The security module 170G may comprise code that causes the processor 170A to validate token requests before a payment token is provided. For example, security module 170G may contain logic that causes the processor 170A to confirm that a token request message is authentic by decrypting a cryptogram included in the message, by confirming that the payment credentials are authentic and associated with the requesting user 110, by assessing risk associated with the requesting resource provider computer 130, or by using any other suitable information. If the payment credentials are encrypted, the security module 170G may be able to decrypt the encrypted payment credentials (e.g. via an issuer-specific key).

As shown and described with respect to FIG. 1, the system 100 allows tokens to be request through alternative communication channels, such as authorization rails. In some embodiments, an entity that sends a token request message may be referred to as a "first computer." Accordingly, the resource provider computer 130 and/or the access device 125 could be considered examples of a first computer. In some embodiments, an entity that provides tokens may be referred to as a "second computer." Accordingly, the tokenization computer 170 could be considered an example of a second computer.

Figure 6:
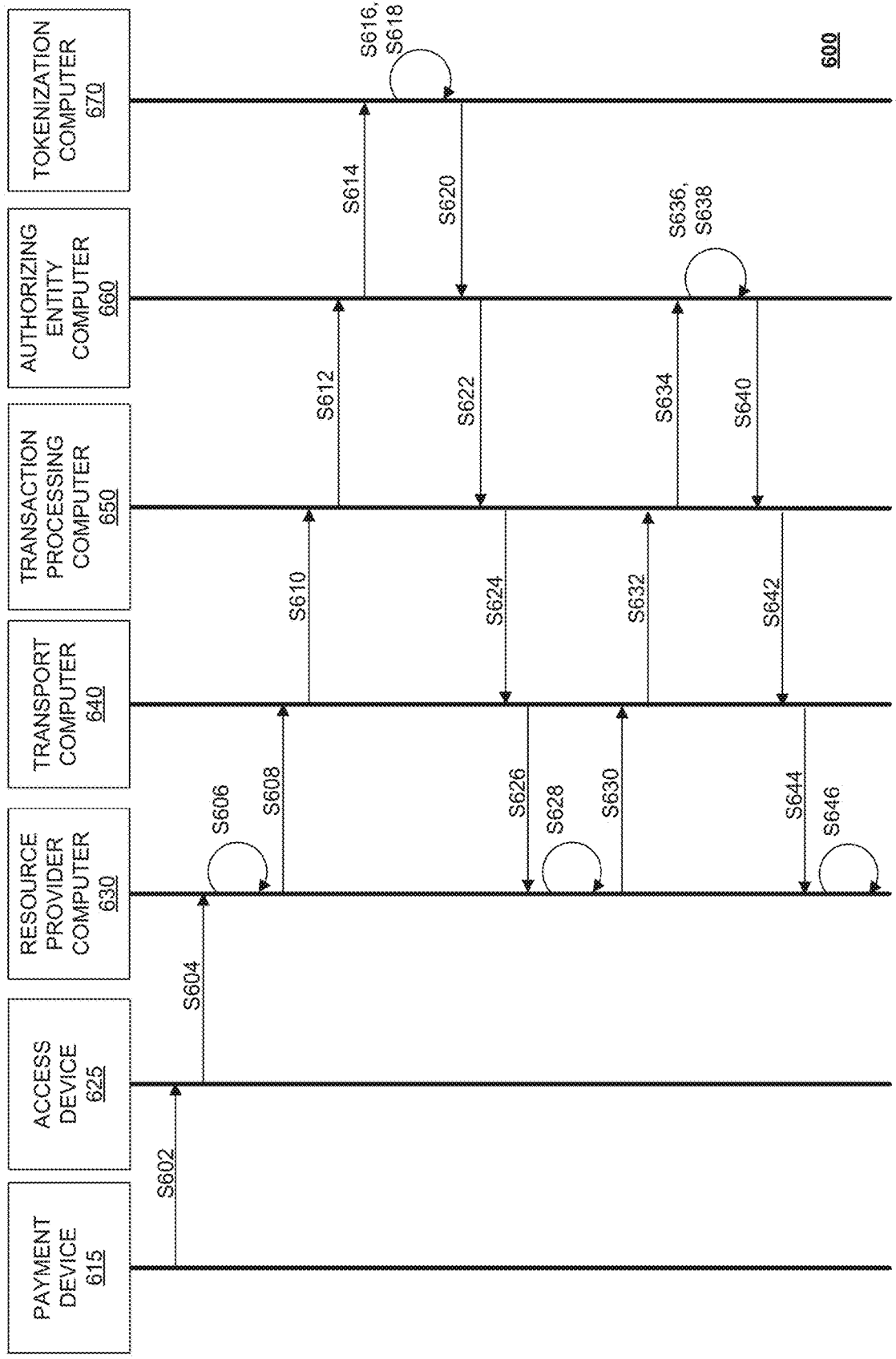
FIG. 6 shows a flow diagram illustrating a method for obtaining a payment token for a payment device, according to embodiments of the invention.

A method 600 according to embodiments of the invention can be described with respect to FIG. 6. In the method illustrated in FIG. 6, credentials may be passed from the payment device 615 to the access device 625 to initiate the token request process and the payment transaction process. The method in FIG. 6 advantageously allows payment devices such as magnetic stripe cards to be used in a tokenization process, even though such payment devices have limited functionality. The steps shown in the method 600 may be performed sequentially or in any suitable order in embodiments of the invention. In some embodiments, one or more of the steps may be optional.

The user may wish to purchase a good or service from the resource provider. At step S602, in order to perform the purchase, the user may provide payment credentials (e.g. via the payment device 615) to the access device 625. For example, in some embodiments, the user may swipe a magnetic stripe card at the access device 625, or the user may present a smart card with contactless communication capabilities (e.g. NFC, Bluetooth, RF, etc.) to the access device 625. The payment device 615 may provide a PAN, a security code, an expiration date, a name, an address, a phone number, and/or any other suitable payment credentials.

At step S604, the resource provider computer 630 may receive (e.g. via the access device 625 or an online webpage) the payment credentials. In some embodiments, the resource provider computer 630 may then encrypt the payment credentials. For example, the resource provider computer 630 may encrypt the payment credentials with an issuer-specific key. Alternatively, in some embodiments, the resource provider computer 630 may encrypted payment credentials that are already encrypted. For example, the payment device 615 may use an issuer-specific key to encrypt the payment credentials, and may transmit the encrypted payment credentials to the access device 625. Accordingly, the resource provider computer 630 may not have access to sensitive unencrypted payment credentials.

At step S606, the resource provider computer 630, may determine that a payment token may be requested for the payment credentials. For example, in some embodiments, the resource provider computer 630 may recognize that the payment credentials include a PAN and not a payment token. The first six digits of a PAN may include a BIN, so if a valid BIN is present in the payment credentials, then it may be determined that the payment credentials include a PAN. In some embodiments, a payment token may be requested for certain types of payment devices 615, such as payment devices 615 that are associated with a certain authorizing entity computer 660 or transaction processing computer 650.

At step S608, the resource provider computer 630 may send a token request message to the transport computer 640. The token request message may include the payment credentials, which may be encrypted. The token request message may also include transaction information, a merchant ID, a cryptogram, a digital certificate (e.g., which may be signed by a key held by the resource provider computer 630), and/or any other suitable information. In some embodiments, the token request message may have an indication that it was sent by the resource provider computer 630 on behalf of the user, and may include any suitable user information.

The token request message may be transmitted through channels typically used for authorization request messages, and/or the token request message may be formatted similarly to an authorization request message. For example, the token request message may have an ISO 8583 message format. Also, the token request message may be a zero-dollar or no amount authorization request message. Similar to how an authorization request message can be forwarded, at step S610, the transport computer 640 may forward the token request message to the transaction processing computer 650. Further, at step S612, the transaction processing computer 650 may forward the token request message to the authorizing entity computer 660 associated with the payment credentials. In some embodiments, the transaction processing computer 650 may also analyze risk associated with the request and/or perform any other suitable checks and processing before forwarding the token request message.

At step S614, the authorizing entity computer 660 may forward the token request message to the tokenization computer 670. The authorizing entity computer 660 may forward the message after determining that the received message is a token request message and not an authorization request message (e.g., based on an indicator that it is a token request, based on a lack of transaction-related information such as a transaction amount).

At step S616, the tokenization computer 670 may validate the token request message (e.g. based on a cryptogram, transaction information, merchant information, the payment credentials, or any other suitable information in the token request message). In some embodiments, the tokenization computer 670 may use an encryption key to validate a digital certificate included in the token request message. If the payment credentials are encrypted, the tokenization computer 670 may be able to decrypt the encrypted payment credentials (e.g. via an issuer-specific key). In some embodiments, the authorizing entity computer 660 may decrypt the payment credentials before forwarding the token request message to the tokenization computer 670.

At step S618, the tokenization computer 670 may generate a payment token and/or create an association between the payment token and the payment credentials. In some embodiments, the tokenization computer 670 may instead identify an existing payment token that is already associated with the payment credentials.

At step S620, the tokenization computer 670 may send a token response message to the authorizing entity computer 660. The token response message may include the payment token as well as transaction information, a merchant ID, a cryptogram, and/or any other suitable information.

Similar to the token request message described above, the token response message may be transmitted through channels typically used for authorization response messages, and/or the token response message may be formatted similarly to an authorization response message. For example, similar to how an authorization response can be forwarded, at step S622, the authorizing entity computer 660 may forward the token response message to the transaction processing computer 650. Also, at step S624, the transaction processing computer 650 may forward the token response message to the transport computer 640. Further, at step S626, the transport computer 640 may forward the token response message to the resource provider computer 630.

At step S628, the resource provider computer 630 (or the access device 625) may receive the token response message including the payment token. In some embodiments, at this point, the resource provider computer 630 may erase any record of the payment credentials, such that the payment credentials are not stored at the resource provider computer 630. Then, the payment token may be used in place of the payment credentials (e.g. for transaction authorization and record-keeping purposes).

Although the example above describes the resource provider computer 630 generating a token request message and receiving a token response message, in other embodiments, the access device 625 may alternatively perform the above-described functions performed by the resource provider computer 630.

Thus, a request for a payment token associated with the payment device 615 may be sent by the resource provider computer 630 or the access device 625 on behalf of the user, allowing a payment card to be usable within a tokenization system. In some embodiments, having obtained the payment token, the transaction can then proceed to be completed using the payment token instead of the payment credentials.

At step S630, the resource provider computer 630 (or the access device 625) may send an authorization request message for the transaction to the transport computer 640. In some embodiments, the authorization request message may include the payment token instead of the payment credentials. The authorization request message may also include transaction information (e.g. items purchased, amount, etc.), merchant information (e.g. merchant name, location, etc.), and any other suitable information.

At step S632, the transport computer 640 may forward the authorization request message to the transaction processing computer 650. At step S634, the transaction processing computer 650 may forward the authorization request message to the authorizing entity computer 660.

At step S636, the authorizing entity computer 660 may detokenize the payment token and obtain the payment credentials. For example, the authorizing entity computer 660 may obtain the payment credentials from the tokenization computer 670 or from a local token record database. In some embodiments, any other suitable entity may instead detokenize the payment token. For example, the transaction processing computer 650 may detokenize the payment token before forwarding the authorization request message to the authorizing entity computer 660.

At step S638, the authorizing entity computer 660 may authorize or reject the transaction based on the payment credentials. For example, the authorizing entity computer 660 may identify the payment account associated with the payment credentials and/or payment token, and may determine whether there are sufficient funds.

At step S640, the authorizing entity computer 660 may send an authorization response indicating whether or not the transaction was authorized to the transaction processing computer 650. The authorization response message may include the payment token, transaction details, merchant information, and any other suitable information. In some embodiments, in order to protect the payment credentials by limiting exposure, the authorization response message may not include the payment credentials.

At step S642, the transaction processing computer 650 may forward the authorization response message to the transport computer 640. At step S644, the transport computer 640 may forward the authorization response message to the resource provider computer 630.

At step S646, the resource provider computer 630 may release the purchased goods and/or services to the user based on the authorization response message. Further, the resource provider computer 630 may store a transaction record including the payment token, user information, transaction details, and any other suitable information. In some embodiments, the resource provider computer 630 may erase any sensitive information, such as the encrypted or unencrypted payment credentials, but the resource provider computer 630 may store remaining information, such as the payment token.

Embodiments of the invention allow a number of alternatives to various aspects of the method 600. For example, in some embodiments, step S606 and other token requesting steps may be performed by the access device 625. For example, the access device 625 may include instructions for tokenization, or the access device 625 can interface with a resource provider system that can determine whether or not to request a payment token. Further, although the authorizing entity computer 660 in FIG. 6 obtains a token from the tokenization computer 670 and communicates with it to detokenize the token, in other embodiments, these functions may be performed by the transport computer 640 and/or the transaction processing computer 650 (as illustrated in FIG. 1).

As described above, the method 600 advantageously allows the token request message to be sent via channels typically used for authorization request messages, allowing for efficient transmission and utilization of existing pathways. The token request message may be routed to the tokenization computer 670 via a number of entities. For example, as described above, the token request message may be forwarded via the transport computer 640, the transaction processing computer 650, and/or the authorizing entity computer 660.

In some embodiments, the token request message may be forwarded directly to the tokenization computer 670. For example, as shown in FIG. 1, the token request message may be sent directly to the tokenization computer 670 after reaching the transport computer 640, the transaction processing computer 650, the authorizing entity computer 660, or any other suitable entity. In some embodiments, once the token request message is recognized as a token request instead of an authorization request (e.g., by the transport computer 640), the token request may be sent directly to the tokenization computer 670. Further, as described above, in some embodiments the tokenization computer 670 may be embodied as part of another entity, such as the transport computer 640, the transaction processing computer 650, the authorizing entity computer 660. Thus, the token request message may have reached its destination once it arrives at whichever entity is providing the tokenization services.

Similarly, the token response message may be sent via channels typically used for authorization response messages, allowing for efficient transmission and utilization of existing pathways. The token request message may be routed to the resource provider computer 630 via a number of entities. In some embodiments, as shown in FIG. 1, the tokenization computer 670 may send the token response message directly to the transport computer 140, the transaction processing computer 650, and/or any other suitable entity.

In some embodiments, there limits may be placed on the payment token provided in the method 600. For example, the token domain and/or the token expiration date may be configured such that the payment token may only be usable in a certain area (e.g. based on geo-location data), at the resource provider computer 630 (e.g. based on a merchant ID), for the amount of the current transaction, and/or for a certain time period. Also, the payment token may be a one-time use token, and it may only be eligible for the current transaction. In some embodiments, the payment token may be utilized for a purchase immediately after being requested, and accordingly it may be assigned a short lifespan (e.g. it may have an expiration time in the near future). For example, the payment token may only be valid for 1 hour, 10 minutes, 5 minutes, 1 minute, 30 seconds, or any other suitable amount of time. In some embodiments, payment token parameter specifications may be requested in the token request message, or there may be specific rules for tokens associated with the authorizing entity computer 660 or any other suitable entity.

In some embodiments, instead of a magnetic stripe card or smart card, the user may use a different mode of payment, such as a mobile device. The following description relates to embodiments where a mobile device or any other suitable device with increased functionality is used for providing payment during a transaction.

Figure 7:
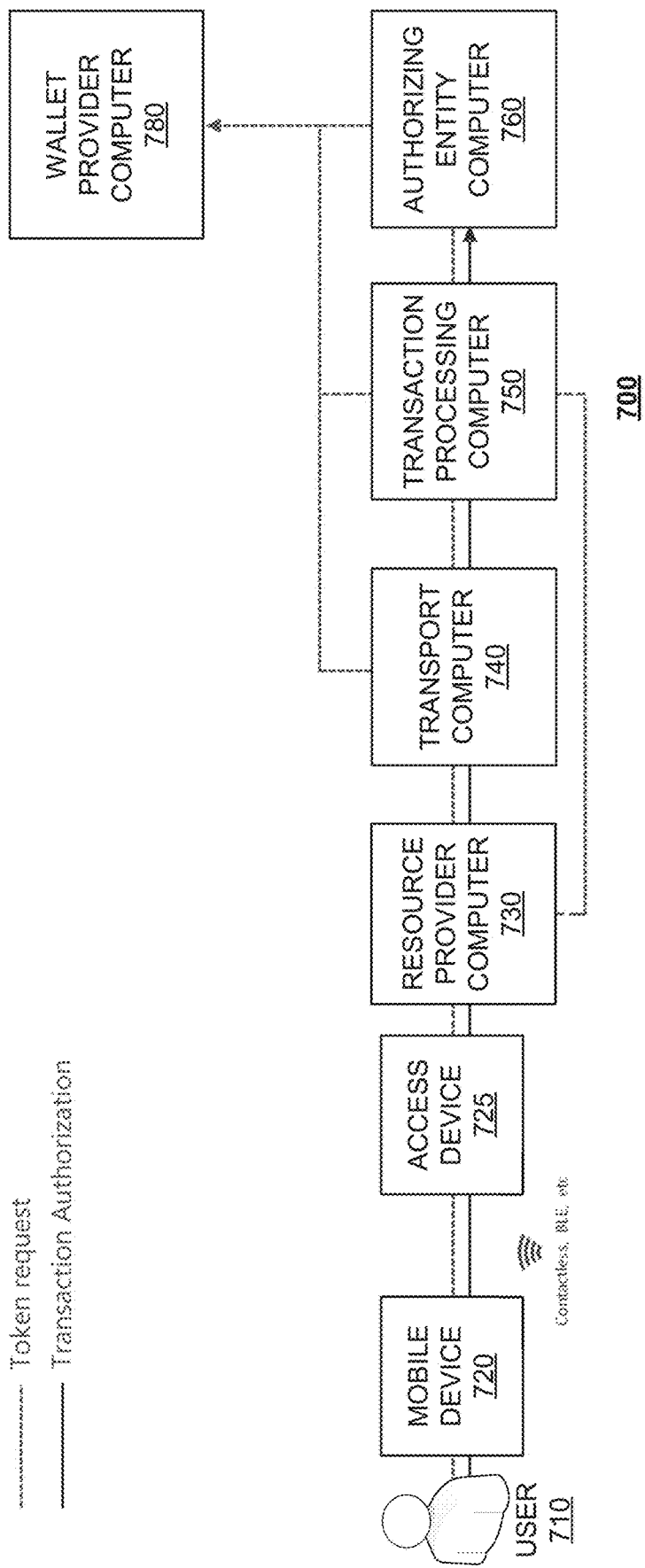
FIG. 7 shows a block diagram of a system for obtaining a payment token for a mobile device, according to an embodiment of the invention.

FIG. 7 shows a system 700 comprising a number of components, according to embodiments of the invention. The system 700 may be similar to the system 100, but some components may be different. For example, instead of the payment device 115, system 700 may comprise a mobile device 720. Also, instead of the tokenization computer 170, system 700 may comprise a wallet provider computer 780. Similar to the system 100, in the system 700, the access device 725 may be associated with and in communication a resource provider computer 730. Further, the resource provider computer 730, a transport computer 740, a transaction processing computer 750, an authorizing entity computer 760, and/or the wallet provider computer 780 may all be in operative communication with each other through any suitable communication channel or communications network.

The user 710 may be able to use the mobile device 720 to conduct transactions with a resource provider associated with the resource provider computer 730. The mobile device 720 may store information associated with the user 710 and/or a payment account. For example, the mobile device 720 may store (e.g., in a secure element) or have access to payment credentials as well as personal information such as a name, address, email address, phone number, or any other suitable user 710 identification information (e.g., via a digital wallet application). The mobile device 720 may be able to provide this information to the access device 725 during a transaction (e.g., via Bluetooth, NFC, RF, or any other suitable type of short range communications). Further, the mobile device 720 may be capable of more complex functions, such as generating request messages and receiving communications from various entities, such as the access device 725 and/or the wallet provider computer 780.

Figure 8:
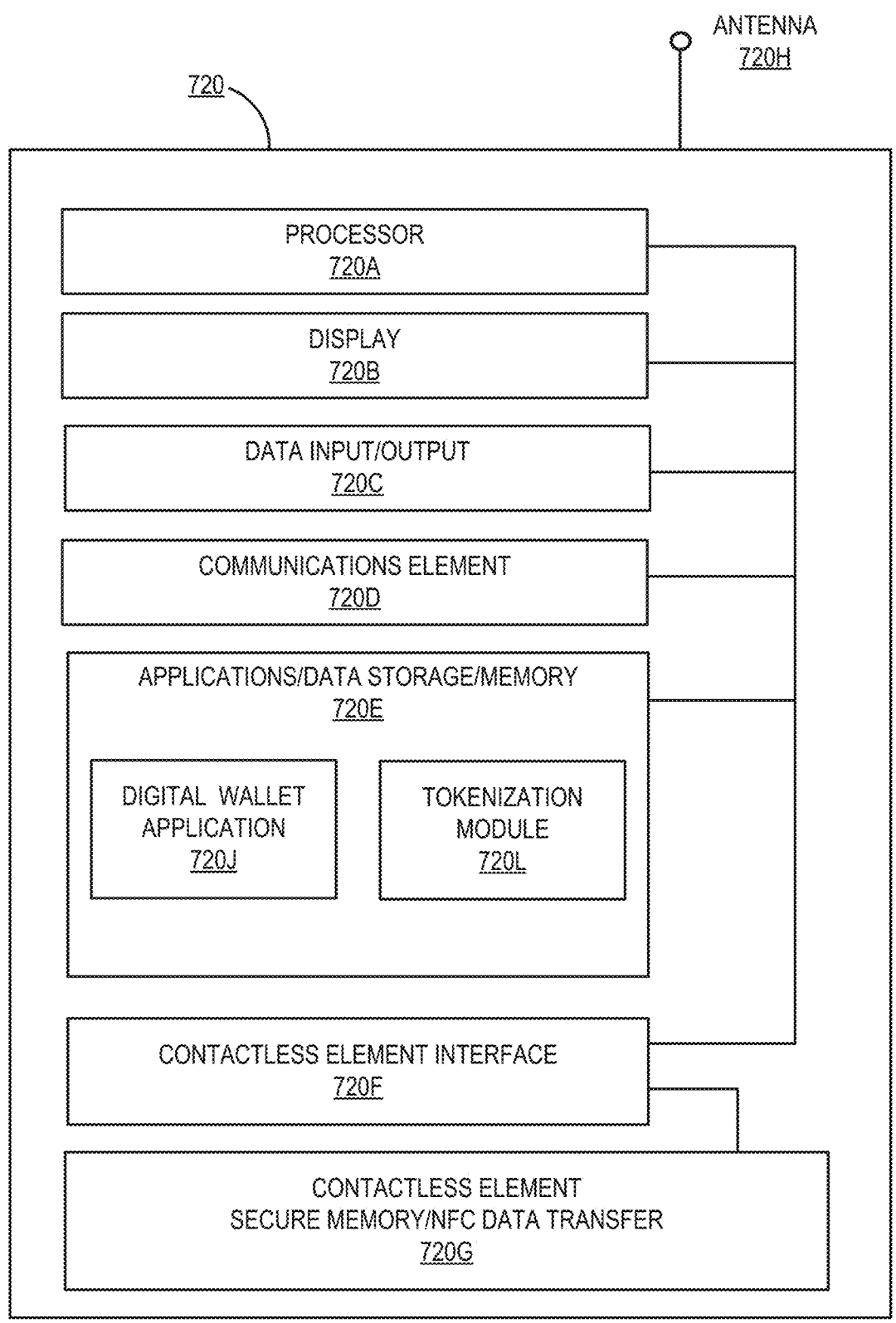
FIG. 8 shows a block diagram of an exemplary mobile device according to an embodiment of the invention.

An example of the mobile device 720, according to some embodiments of the invention, is shown in FIG. 8. Mobile device 720 may include circuitry that is used to enable certain device functions, such as telephony. The functional elements responsible for enabling those functions may include a processor 720A that can execute instructions that implement the functions and operations of the device. Processor 720A may access memory 720E (or another suitable data storage region or element) to retrieve instructions or data used in executing the instructions, such as provisioning scripts and mobile applications. Data input/output elements 720C, such as a keyboard or touchscreen, may be used to enable a user to operate the mobile device 720 and input data (e.g., user authentication data). Data input/output elements may also be configured to output data (via a speaker, for example). Display 720B may also be used to output data to a user. Communications element 720D may be used to enable data transfer between mobile device 720 and a wired or wireless network (via antenna 720H, for example) to assist in connectivity to the Internet or other network, and enabling data transfer functions. Mobile device 720 may also include contactless element interface 720F to enable data transfer between contactless element 720G and other elements of the device, where contactless element 720G may include a secure memory and a near field communications data transfer element (or another form of short range communications technology). As noted, a cellular phone or similar device is an example of a mobile device 720 that may be used in accordance with embodiments of the present invention. However, other forms or types of devices may be used without departing from the underlying concepts of the invention. For example, the mobile device 720 may alternatively be in the form of a payment card, a key fob, a tablet computer, a wearable device, a vehicle such as a car, etc.

The memory 720E may comprise a digital wallet application 720J, a tokenization module 720L, and any other suitable module or data. The mobile device 720 may have any number of mobile applications installed or stored on the memory 720E and is not limited to that shown in FIG. 7. The memory 720E may also comprise code, executable by the processor 720A for implementing a method comprising generating, by the mobile device, a token request message including a credential, the token request message being in the same format as an authorization request message used to authorize a transaction; sending the token request message to a first computer, wherein the first computer sends the token request message to a second computer, and wherein the first computer receives a token response message including a token associated with the credential from the second computer; receiving the token response message from the first computer; and providing the token to the first computer as payment for a transaction, wherein the first computer submits the authorization request message including the token to an authorization computer for the transaction.

The digital wallet application 720J may provide a user interface for the user 710 to provide input and initiate, facilitate, and manage transactions using the mobile device 720. The digital wallet application 720J may be able to store and/or access a payment token and/or payment credentials. The digital wallet application 720J may also store an issuer-specific key, or any other suitable encryption means. The digital wallet application 720J may be able to cause the mobile device 720 to transmit the payment token and/or payment credentials in any suitable manner (e.g., NFC, QR code, etc.). In some embodiments, in order to increase security, payment tokens and/or payment credentials may not be stored at the mobile device 720. Instead, the payment tokens and/or payment credentials can be temporality retrieved from the wallet provider computer 780 when a transaction is being performed.

The digital wallet application 720J may be associated with and/or provided by the wallet provider computer 780, the authorizing entity computer 760, an issuer-trusted third party, the transaction processing computer 750, the transport computer 740, the resource provider computer 730, or any other suitable entity.

The tokenization module 720L may be a module of the digital wallet application 720J or a separate application on the mobile device 120. The tokenization module 720L may comprise code that causes the processor 720A to obtain payment tokens. For example, the tokenization module 720L may contain logic that causes the processor 720A to request a token from the wallet provider computer 780 or any other suitable tokenization service provider (e.g., the authorizing entity computer 760 or the transaction processing computer 750). In some embodiments, the mobile device 120 may be able to communicate over-the-air with the wallet provider computer 780, and thus the tokenization module 720L may be able to send a direct request to the wallet provider computer 780. In some embodiments, the tokenization module 720L may be able to send a token request message to the wallet provider computer 780 via communication channels typically used for authorization messages. For example, the tokenization module 720L may cause the mobile device 720 to send a token request message to the access device 725, and the request may be forwarded through the authorization rails to the wallet provider computer 780.

As mentioned, tokenization services may be provided by the wallet provider computer 780, the authorizing entity computer 760, the transaction processing computer 750, the transport computer 740, or any other suitable entity. The wallet provider computer 780 may additionally be able to provide other digital wallet-related services. For example, the wallet provider computer 780 may provide a digital wallet application, store payment credentials, store transaction records, and perform any other suitable transaction-related services. The wallet provider computer 780 may be associated with and/or in communication with one or more of the resource provider computer 730, the transport computer 740, the transaction processing computer 750, and the authorizing entity computer 760.

Figure 9:
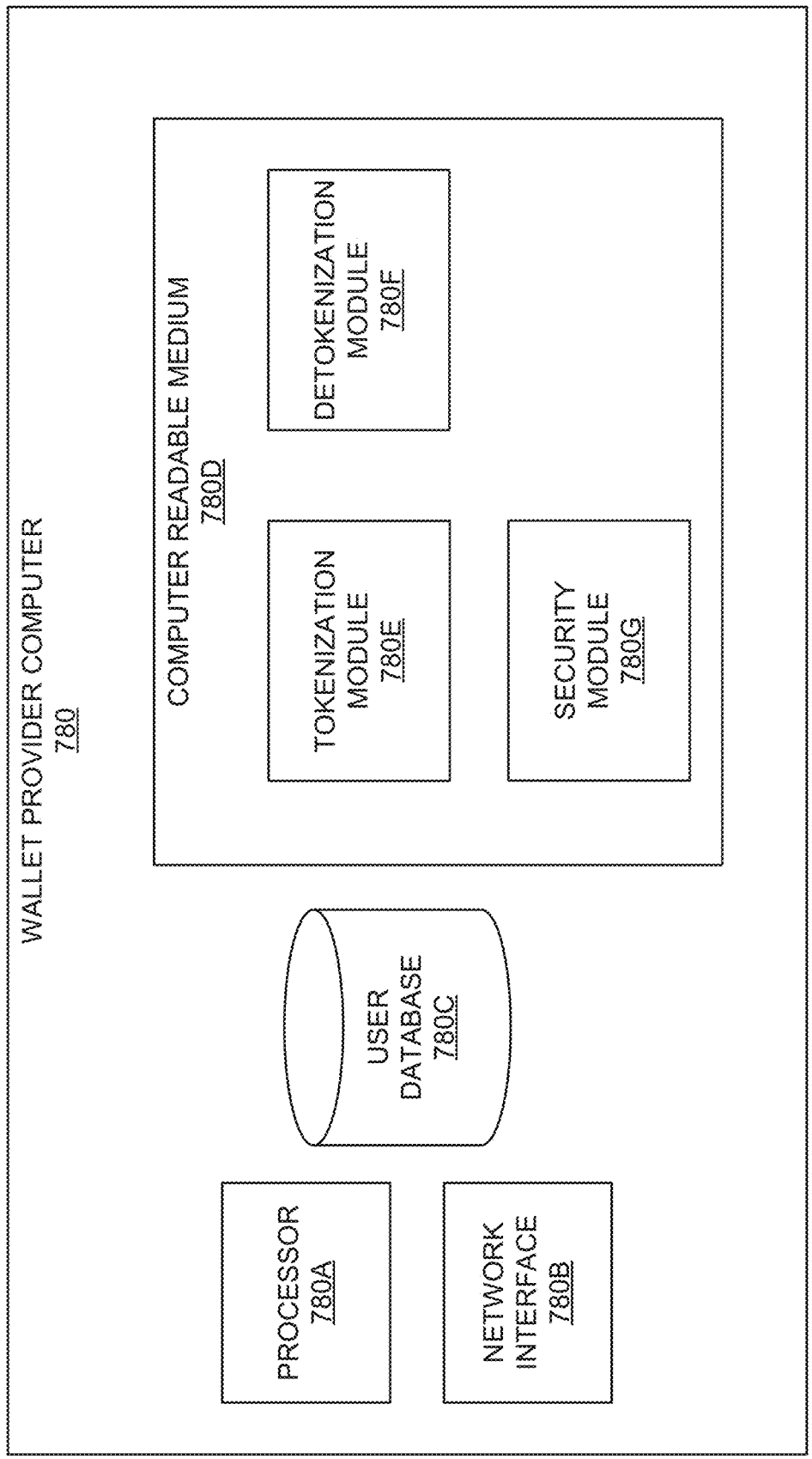
FIG. 9 shows a block diagram of a wallet provider computer according to an embodiment of the invention.

An example of the wallet provider computer 780, according to some embodiments of the invention, is shown in FIG. 9. The wallet provider computer 780 comprises a processor 780A, a network interface 780B, a user database 780C, and a computer readable medium 780D.

The computer readable medium 780D may comprise a tokenization module 780E, a detokenization module 780F, a security module 780G, and any other suitable software module. The computer readable medium 780D may also comprise code, executable by the processor 780A for implementing a method comprising receiving, at a second computer, a token request message including a credential from a first computer, the token request message being in the same format as an authorization request message used to authorize a transaction; validating the token request message; assigning a token to the credential; generating a token response message including the token, the token response message being in the same format as an authorization response message; and transmitting the token response message to the first computer.

The tokenization module 780E may comprise code that causes the processor 780A to provide payment tokens. For example, tokenization module 780E may contain logic that causes the processor 780A to generate a payment token and/or associate the payment token with a set of payment credentials. A token record may then be stored in the user database 780C indicating that the payment token is associated with a certain user 710, a certain set of payment credentials, or a certain digital wallet. The tokenization module 780E may be able to send a token response message including the payment token along communication rails normally used for authorization response messages.

The detokenization module 780F may comprise code that causes the processor 780A to detokenize payment tokens. For example, the detokenization module 780F may contain logic that causes the processor 780A to identify a token record associated with a payment token in the user database 780C. A set of payment credentials associated with the payment token (as indicated in the token record or digital wallet) can then be identified. In some embodiments, the detokenization module 780F may detokenize a payment token in response to a detokenization request message (e.g., received from the authorization entity computer 760, the transaction processing computer 750, or any other suitable entity).

The security module 780G may comprise code that causes the processor 780A to validate token requests before a payment token is provided. For example, security module 780G may contain logic that causes the processor 780A to confirm that a token request message is authentic by decrypting a cryptogram included in the message, by confirming that the payment credentials are authentic and associated with the requesting user 710, by checking that the use of payment tokens is approved for an associated digital wallet, by assessing risk associated with the requesting resource provider computer 730, or by using any other suitable information. If the payment credentials are encrypted, the security module 780G may be able to decrypt the encrypted payment credentials (e.g. via an issuer-specific key).

Similar to FIG. 1, various entities in FIG. 7 could be referred to as a first computer or a second computer. For example, the resource provider computer 730 and/or the access device 725 could be considered examples of a first computer, and the wallet provider computer 780 could be considered an example of a second computer.

Figure 10:
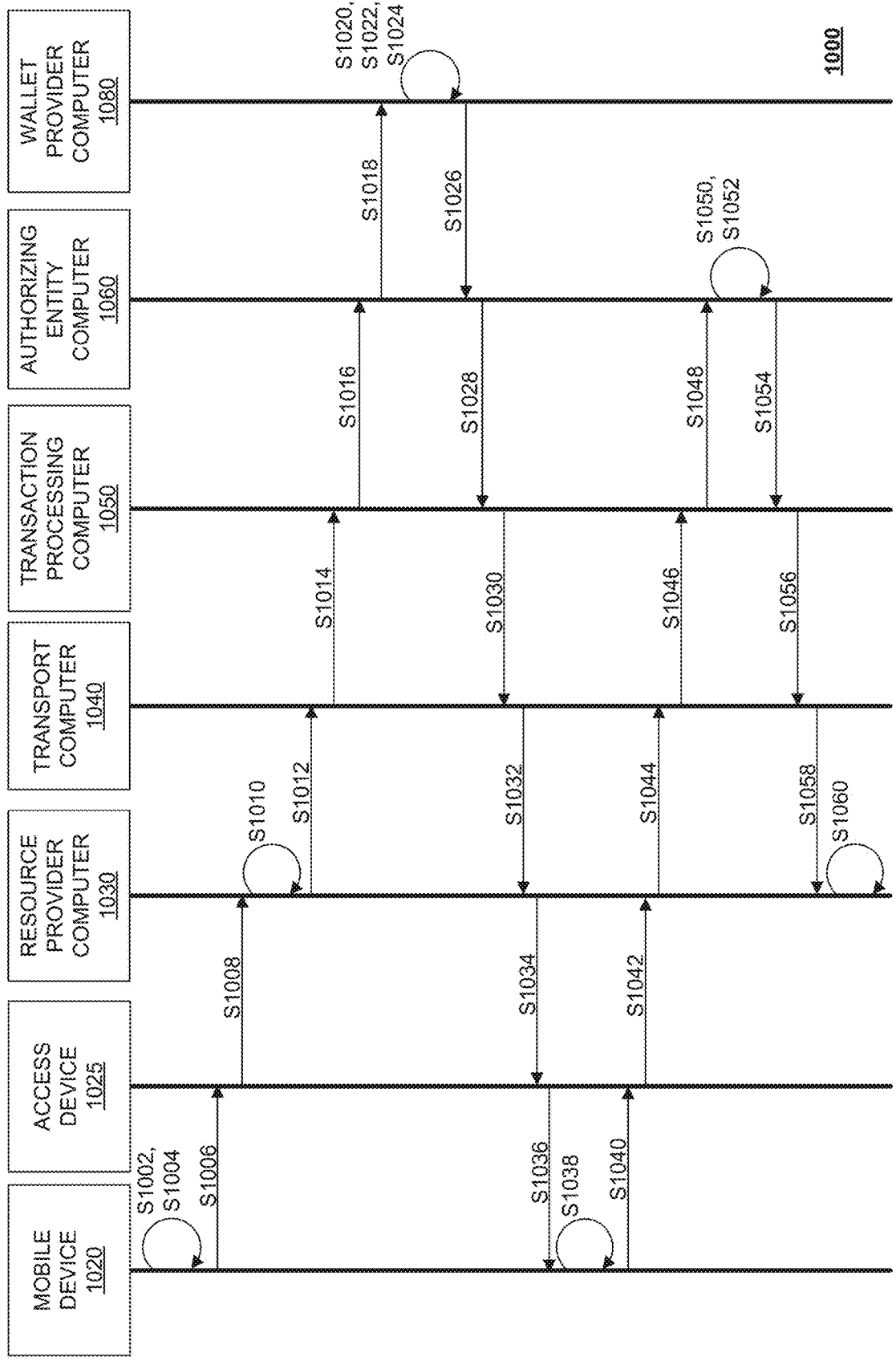
FIG. 10 shows a flow diagram illustrating a method for obtaining a payment token for a mobile device, according to embodiments of the invention.

A method 1000 according to embodiments of the invention can be described with respect to FIG. 10. In the method 1000 illustrated in FIG. 10, a mobile device 1020 may use authorization communication channels to obtain and load a token thereon. Once the mobile device 1020 contains the token, it can be used at any suitable resource provider (e.g., any suitable merchant), and not just the resource provider that was used to obtain the token for the mobile device 1020. Some elements in other Figures are also referred to. The steps shown in the method 1000 may be performed sequentially or in any suitable order in embodiments of the invention. In some embodiments, one or more of the steps may be optional.

The user may wish to purchase a good or service from the resource provider. The user may wish to use the mobile device 1020 for providing payment. In some embodiments, in order to avoid compromise of payment information, the mobile device 1020 may not store payment credentials and/or payment tokens. Instead, the mobile device 1020 may wait until a transaction is about to take place before it retrieves a payment token from the wallet provider computer 1080. However, there may not always be a sufficient over-the-air connection (e.g., cellular or Wi-Fi) for the mobile device 1020 to communicate with the wallet provider computer 1080. Accordingly, the mobile device 1020 may instead leverage the resource provider's ability to communicate with the wallet provider computer 1080 via normal authorization channels.

At step S1002, the mobile device 1020 may activate a digital wallet application and/or a payment function. For example, the user may select a payment function in order to pay for the transaction.

At step S1004, the mobile device 1020 may generate a token request message (e.g., in response to a payment function being activated). The token request message may include payment information (e.g. a PAN, security code, expiration date, name, address, and/or phone number), information identifying the wallet provider computer 1080, and any other suitable information. Alternatively, in some embodiments, the token request message may not include payment credentials in order to protect the sensitive data. Instead, the token request message may include a digital wallet identifier, mobile device identifier, or any other suitable information that can be used to identify the user's digital wallet or payment account.

In some embodiments, the some or all of the information included in the token request message may be encrypted with an issuer-specific key. Further, the token request message may include a cryptogram, a digital certificate (e.g., which may be signed by a key held by the mobile device 1020), and/or any other security-related information.

At step S1006, the mobile device 1020 may transmit the token request message to the access device 1025 (e.g., via NFC, Bluetooth, RF, etc.). For example, the user may hold the mobile device 1020 near enough to the access device 1025 so that they can communicate wirelessly.

At step S1008, the resource provider computer 1030 may receive (e.g. via the access device 1025) the token request message. In some embodiments, the token request message may include encrypted payment credentials or no payment credentials, and thus the resource provider computer 1030 may not have access to sensitive unencrypted payment credentials.

At step S1010, the resource provider computer 1030 may determine that the token request message should be sent to the wallet provider computer 1080. For example, the token request message may be formatted as an authorization request message (e.g., an ISO 8583 message format) such that the resource provider computer 1030 can determine that the message should be forwarded along as an authorization request message. The resource provider computer 1030 may also detect a flag or indicator in the token request message specifying that the token request message should be forwarded. Additionally, the resource provider computer 1030 may optionally add transaction information, a merchant ID, a cryptogram, a digital certificate (e.g., which may be signed by a key held by the resource provider computer 1030), and/or any other suitable information to the token request message.

At steps S1012, S1014, S1016, and S1018, the token request message may be forwarded to the transport computer 1040, to the transaction processing computer 1050, authorizing entity computer 1060, and then the wallet provider computer 1080. Thus, the token request message may be transmitted through channels typically used for authorization request messages.

In some embodiments, the transaction processing computer 1050 and/or the authorizing entity computer 1060 may also analyze risk associated with the request and/or perform any other suitable checks and processing before forwarding the token request message. Further, the authorizing entity computer 1060 may forward the message to the wallet provider computer 1080 after determining that the received message is a token request message. For example, the authorizing entity computer 1060 may determine that the token request message includes an token request indicator, that the token request message lacks transaction-related information such as a transaction amount (or it includes a zero or no-dollar amount), or that the token request message lacks payment credentials.

At step S1020, the wallet provider computer 1080 may authenticate the token request message and/or the requesting digital wallet application. For example, the token request message may be validated based on a cryptogram, merchant information, the payment credentials, transaction information, or any other suitable information in the token request message. In some embodiments, the wallet provider computer 1080 may use an encryption key to validate a digital certificate included in the token request message. In some embodiments, the wallet provider computer 1080 may open a secure and private channel between the wallet provider computer 1080 and the mobile device 1020. This may enable mobile security checks (e.g. by the security module 780G) and token provisioning functions to occur. These functions may involve multiple communications/messages being sent between the mobile device 320 and the wallet provider server computer 380.

At step S1022, the wallet provider computer 1080 may identify the payment account and/or payment credentials for which a token is being requested. For example, if the payment credentials are included in the token request message, the wallet provider computer 1080 can locate the payment credentials within the message. If the payment credentials are encrypted, the wallet provider computer 1080 may be able to decrypt them (e.g. via an issuer-specific key).

In some embodiments, the authorizing entity computer 1060 may decrypt the payment credentials before forwarding the token request message to the wallet provider computer 1080.

Alternatively, in some embodiments, the wallet provider computer 1080 may identify the user's record or the user's digital wallet (e.g., in the user database 780C) based on other information in the token request message, such as a digital wallet identifier, mobile device identifier, or any other suitable information. Then, a set of payment credentials can be obtained from the identified digital wallet.

At step S1024, the wallet provider computer 1080 may generate a payment token and/or create an association between the payment token and the payment credentials. In some embodiments, the wallet provider computer 1080 may instead identify an existing payment token that is already associated with the payment credentials. In some embodiments, as already described above for the method 600, there may be limits placed in the token domain and/or the token expiration date of the payment token.

At step S1026, the wallet provider computer 1080 may generate and send a token response message to the authorizing entity computer 1060. The token response message may include the payment token as well as transaction information, a merchant ID, a cryptogram, a digital wallet application identifier, a mobile device identifier, and/or any other suitable information. Some or all of the information included in the token response message may be encrypted with an issuer-specific key. The token response message may have an ISO 8583 message format, and/or the token response message may be formatted as a zero or no-dollar authorization response message.

At steps S1028, S1030, S1032, and S1034, the token response message may be forwarded to the transaction processing computer 1050, to the transport computer 1040, to the resource provider computer 1030, and then to the access device 1025. Thus, token response message may be transmitted through channels typically used for authorization response messages.

In some embodiments, the token response message may be routed to the access device 1025 in a different manner. For example, as shown in FIG. 7, the wallet provider computer 1080 may send the token response message directly to the transport computer 1040, the transaction processing computer 1050, and/or any other suitable entity.

At step S1036, the access device 1025 may send the token response message to the mobile device 1020. For example the user may still be holding the mobile device 1020 in within communication proximity of the access device 1025, or the user may be prompted to hold out the mobile device 1020 again.

At step S1038, the mobile device 1020 may associate the payment token with the digital wallet application or a certain set of payment credentials. The payment token may be stored at the mobile device 1020, or it may be deleted after being used for a transaction.

Thus, the mobile device 1020 may successfully leverage the connectivity of an access device 1025 for obtaining a payment token from the wallet provider computer 1080 via authorization communication channels. Accordingly, the mobile device 1020 can obtain payment tokens in real time during a transaction, and the mobile device 1020 can obtain payment tokens even when other wireless communication services (e.g., 3G, LTE, Wi-Fi) are unavailable. After receiving the payment token, the digital wallet application on the mobile device 1020 may then be able to use the payment token for the current transaction.

At step S1040, the mobile device 1020 may transmit the payment token to the access device 1025 as payment for the transaction. For example, the user may continue to hold the mobile device 1020 near the access device 1025 so that communication (e.g., NFC, Bluetooth, RF, etc.) is possible. Alternatively, the access device 1025 may prompt the user to provide payment information (e.g., raise the mobile device 1020 again) after the token requesting process was completed. Note that since the mobile device 1020 is now loaded with a payment token, it can use that payment token at any other suitable access device at any other suitable resource provider and not just at the access device 1025.

At step S1042, the access device 1025 may forward the payment token to the resource provider computer 1030 for processing. The access device 1025 may also provide transaction details and any other suitable information.

At step S1044, the resource provider computer 1030 (or the access device 1025) may send an authorization request message for the transaction to the transport computer 1040. In some embodiments, the authorization request message may include the payment token instead of the payment credentials. The authorization request message may also include transaction information (e.g. items purchased, amount, etc.), merchant information (e.g. merchant name, location, etc.), and any other suitable information.

At step S1046, the transport computer 1040 may forward the authorization request message to the transaction processing computer 1050. At step S1048, the transaction processing computer 1050 may forward the authorization request message to the authorizing entity computer 1060.

At step S1050, the authorizing entity computer 1060 may detokenize the payment token and obtain the payment credentials. For example, the authorizing entity computer 1060 may obtain the payment credentials from the wallet provider computer 1080, from a local token record database, or from any other suitable token provider. In some embodiments, any other suitable entity may instead detokenize the payment token. For example, the transaction processing computer 1050 may detokenize the payment token before forwarding the authorization request message to the authorizing entity computer 1060.

At step S1052, the authorizing entity computer 1060 may authorize or decline the transaction based on the payment credentials. For example, the authorizing entity computer 1060 may identify the payment account associated with the payment credentials and/or payment token, and may determine whether there are sufficient funds.

At step S1054, the authorizing entity computer 1060 may send an authorization response indicating whether or not the transaction was authorized to the transaction processing computer 1050. The authorization response message may include the payment token, transaction details, merchant information, and any other suitable information. In some embodiments, in order to protect the payment credentials by limiting exposure, the authorization response message may not include the payment credentials.

At step S1056, the transaction processing computer 1050 may forward the authorization response message to the transport computer 1040. At step S1058, the transport computer 1040 may forward the authorization response message to the resource provider computer 1030.

At step S1060, the resource provider computer 1030 may release the purchased goods and/or services to the user based on the authorization response message. Further, the resource provider computer 1030 may store a transaction record including the payment token, user information, transaction details, and any other suitable information. In some embodiments, the resource provider computer 1030 may erase any sensitive information, such as the encrypted or unencrypted payment credentials, but the resource provider computer 1030 may store remaining information, such as the payment token.

Embodiments of the invention allow a number of alternatives to various aspects of the method 1000. For example, in some embodiments, step S1010 and other token requesting steps may be performed by the access device 1025.

Additionally, in some embodiments, the token request message may be forwarded more directly to the wallet provider computer 1080. For example, as shown in FIG. 7, the token request message may be sent directly to the wallet provider computer 1080 after reaching the transport computer 1040, the transaction processing computer 1050, the authorizing entity computer 1060, or any other suitable entity. In some embodiments, once the token request message is recognized as a token request instead of an authorization request (e.g., by the transport computer 1040), the token request may be sent directly to the wallet provider computer 1080.

Further, as described above, in some embodiments the wallet provider computer 1080 may be embodied as part of another entity, such as the transport computer 1040, the transaction processing computer 1050, the authorizing entity computer 1060. Thus, the token request message may have reached its destination once it arrives at whichever entity is providing the tokenization services. The token request message may include a recipient identifier (e.g. a wallet provider ID or an issuer ID), such that the message can be directed to the appropriate recipient.

As described above in the method 1000, one or more communications can take place between the mobile device 1020 and the access device 1025. In some embodiments, the total time needed for communications between the mobile device 1020 and the access device 1025 (e.g., sending a token request, receiving a token response, providing payment, and/or receiving a transaction receipt) may be 30 seconds, 10 seconds, 5 seconds, 3 seconds, 1 second, or any other suitable amount of time. The time may vary from transaction to transaction. The user may hold the mobile device 1020 at or near the access device 1025 while the communications are taking place, and may remove the mobile device 1020 when the communications are finished.

In some embodiments, the user may be informed of communication progress and/or when it is acceptable to remove the mobile device 1020. For example, the access device 1025 and/or the mobile device 1020 may provide an indication when the communications are completed, such as an audible sound, a vibration, an electric pulse, and/or a displayed message.

Embodiments of the invention have a number of advantages. For example, in embodiments of the invention, payment devices such as credit cards can be integrated and used in payment systems that involve tokenization. Accordingly, users that do not have a mobile device or that are accustomed to a certain type of payment device (e.g. magnetic stripe credit cards) can participate in tokenization systems. Thus, a transition is provided from previous payment systems without tokenization to new payment systems with tokenization. Also, security may be increased for purchases made with payment devices such as credit cards, because a token can be provided and stored instead of sensitive payment information (e.g. a PAN).

Another advantage is that it may be easy for users to obtain tokens. The user might simply present a payment card or mobile device at an access device, and a token may be retrieved and then used for a purchase. Accordingly, the token requesting process may be seamless or undetected to the user.

Additionally, a mobile device may be able to obtain tokens when the mobile device does not have any connectivity (e.g. cell service, Wi-Fi, etc.). A merchant access device can essentially act as connectivity point (which is secure and reliable) through which the mobile device can request and receive tokens.

Further, tokens may only be valid for a short time duration because tokens may be used for a purchase immediately after being received. Accordingly, security may be increased, because if a token is compromised it may not be usable for fraudulent transactions at a later time. Also, devices that might retrieve and store tokens ahead of time (e.g. mobile devices, smart cards, etc.) may no longer need to store tokens, because tokens can be obtained during a transaction. Tokens stored on devices can be vulnerable because small devices are easily lost, and the tokens are often only protected by software. Accordingly, reducing the amount of time a token spends on a device before being used can reduce the risk of tokens being stolen or compromised.

Figure 11:
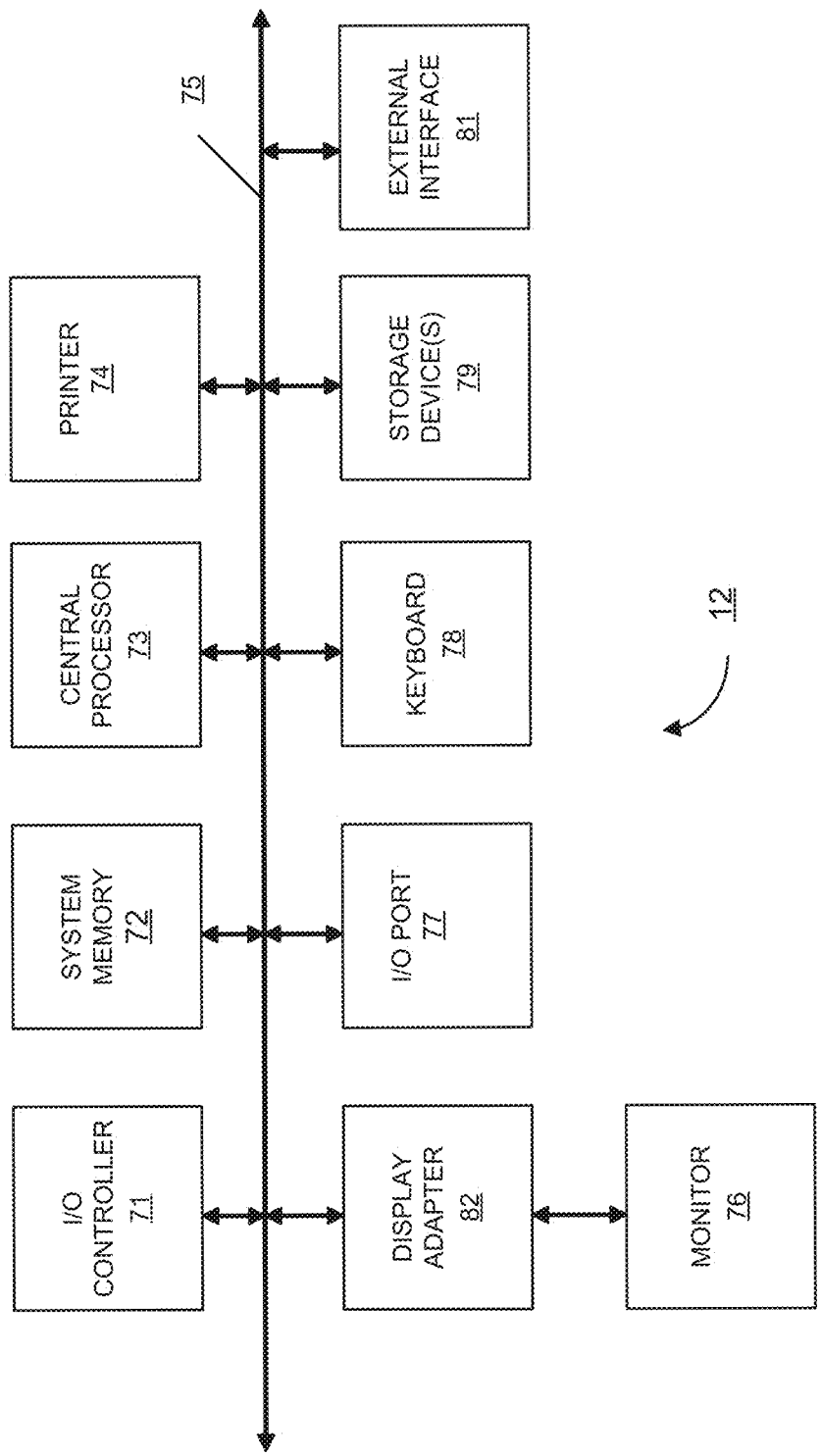
FIG. 11 shows a block diagram of a computer apparatus according to an embodiment of the invention.

FIG. 11 is a high-level block diagram 12 of a computer system that may be used to implement any of the entities or components described above. The subsystems shown in FIG. 11 are interconnected via a system bus 75. Additional subsystems include a printer 74, keyboard 78, storage device 79, and monitor 76, which is coupled to display adapter 82. Peripherals and input/output (I/O) devices, which couple to I/O controller 71, can be connected to the computer system by any number of means known in the art, such as a serial port. For example, I/O port 77 or external interface 81 can be used to connect the computer apparatus to a wide area network such as the Internet, a mouse input device, or a scanner. The interconnection via system bus 75 allows the central processor 73 to communicate with each subsystem and to control the execution of instructions from system memory 72 or the storage device 79, as well as the exchange of information between subsystems. The system memory 72 and/or the storage device may embody a computer-readable medium.

Other embodiments of the invention are also contemplated.

One embodiment of the invention is directed to a method comprising receiving, at a second computer, a token request message including a credential from a first computer, the token request message being in the same format as an authorization request message used to authorize a transaction; validating, by the second computer, the token request message; assigning, by the second computer, a token to the credential; generating, by the second computer, a token response message including the token, the token response message being in the same format as an authorization response message; and transmitting, by the second computer, the token response message to the first computer.

Another embodiment of the invention is directed to a second computer configured to perform the above-described method. In some embodiments, the second computer may be a tokenization computer and/or a wallet provider computer.

Another embodiment of the invention is directed to a method comprising generating, by a mobile device, a token request message including a credential, the token request message being in the same format as an authorization request message used to authorize a transaction; sending, by the mobile device, the token request message to a first computer, wherein the first computer sends the token request message to a second computer, and wherein the first computer receives a token response message including a token associated with the credential from the second computer; receiving, by the mobile device, the token response message from the first computer; and providing, by the mobile device, the token to the first computer as payment for a transaction, wherein the first computer submits the authorization request message including the token to an authorization computer for the transaction.

Another embodiment of the invention is directed to a mobile device configured to perform the above-described method.

Another embodiment of the invention is directed to a method comprising receiving, by an intermediary computer, a token request message including a credential from a first computer, the token request message being in the same format as an authorization request message used to authorize a transaction; transmitting, by the intermediary computer, the token request message to a second computer; receiving, by the intermediary computer, a token response message including a token associated with the credential from the second computer, the token response message being in the same format as an authorization response message; transmitting, by the intermediary computer, the token response message to the first computer; receiving, by the intermediary computer, the authorization request message from the first computer for the transaction, the authorization request message including the token; transmitting, by the intermediary computer, the authorization request message to an authorization computer; receiving, by the intermediary computer, the authorization response message from the authorization computer, the authorization response message indicating that the transaction is authorized; and transmitting, by the intermediary computer, the authorization response message to the first computer.

Another embodiment of the invention is directed to an intermediary computer configured to perform the above-described method. In some embodiments, the intermediary computer may be a transport computer or a transaction processing computer.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method comprising:
   receiving, by a first computer, a credential for a transaction;
   sending, by the first computer, a token request message including the credential to a token provider computer via a transport computer, a transaction processing computer, and an authorizing entity computer;
   receiving, at the first computer, a token response message including a token from the token provider computer via the transport computer, the transaction processing computer, and the authorizing entity computer, wherein the token is associated with the credential;
   generating, by the first computer, an authorization request message comprising the token and an amount for the transaction;
   submitting, by the first computer, the authorization request message including the token and the amount to the authorizing entity computer via the transport computer and the transaction processing computer for the transaction, wherein the token request message and the authorization request message are in the same format; and
   in response to submitting the authorization request message, receiving, by the first computer, from the authorizing entity computer via the transport computer and the transaction processing computer, an authorization response message including an authorization result for the transaction.

2. The method of claim 1, wherein the credential is received from a mobile device.

3. The method of claim 1, wherein the first computer is a point of sale terminal, the credential is a payment account number, the token is a payment token, and the transaction is a payment transaction.

4. The method of claim 1, further comprising:
   validating, by the token provider computer, the token request message;
   creating, by the token provider computer, an association between the token and the credential;
   sending, by the token provider computer, the token response message including the token to the first computer;
   receiving, by the authorizing entity computer, the authorization request message including the token and the amount; and
   authorizing, by the authorizing entity computer, the transaction based on the token.

5. The method of claim 1, wherein the token request message is formatted as an ISO 8583 message.

6. The method of claim 1, wherein the token is valid for 1 minute, 5 minutes, or 1 hour.

7. The method of claim 1, wherein the credential is encrypted.

8. The method of claim 1, the token request message having an ISO 8583 format, the authorization request message having an ISO 8583 message format, the token response message having an ISO 8583 format, and the authorization response message having an ISO 8583 message format.

9. The method of claim 1, wherein the token request message and the authorization request message are both transmitted through the same communication channel.

10. The method of claim 9, wherein the same communication channel is a transaction authorization communication channel that includes the transport computer and the transaction processing computer.

11. A system comprising:
a first computer comprising:
  a first processor; and
  a first non-transitory computer readable medium, storing executable instructions that, when executed, cause the first processor to perform the steps of:
    receiving a credential for a transaction;
    sending a token request message including the credential to a token provider computer via a transport computer, a transaction processing computer, and an authorizing entity computer;
    receiving a token response message including a token from the token provider computer via the transport computer, the transaction processing computer, and the authorizing entity computer, wherein the token is associated with the credential;
    generating an authorization request message comprising the token and an amount for the transaction;
    submitting the authorization request message including the token and the amount to the authorizing entity computer via the transport computer and the transaction processing computer for the transaction, wherein the token request message and the authorization request message are in the same format; and
    in response to submitting the authorization request message, receiving from the authorizing entity computer via the transport computer and the transaction processing computer, an authorization response message including an authorization result for the transaction.

12. The system of claim 11, furthering comprising:
the token provider computer, comprising:
  a second processor; and
  a second non-transitory computer readable medium, storing instructions that, when executed, cause the second processor to perform the steps of:
    validating the token request message;
    creating an association between the token and the credential;
    sending the token response message including the token to the first computer; and
the authorizing entity computer comprising:
  a third processor; and
  a third non-transitory computer readable medium, storing executable instructions that, when executed, cause the third processor to perform the steps of:
    receiving the authorization request message including the token and the amount; and
    authorizing the transaction based on the token.

13. The system of claim 11, wherein the credential is received from a mobile device.

14. The system of claim 13, wherein there is no wireless communication connectivity between the mobile device and the token provider computer.

15. The system of claim 13, wherein the token is not sent over the air directly from the token provider computer to the mobile device.

16. The system of claim 11, wherein the token request message is in the format of an authorization request message, the token request message having a zero amount in an authorization amount field.

17. The system of claim 11, wherein the token is a substitute for the credential, the authorization request message comprises the token in place of the credential, the authorization request message does not include the credential, and the authorization response message includes the token and does not include the credential.

18. The system of claim 11, wherein the authorization request message is submitted to request authorization for the transaction.

19. The system of claim 11, wherein the transaction processing computer includes data processing subsystems that deliver authorization services and clearing and settlement services.

20. The system of claim 11, wherein the token request message is submitted to request the token, and is not submitted to request authorization for the transaction.

* * * * *